United States Patent [19]

Kurita et al.

[11] Patent Number: 4,825,461
[45] Date of Patent: Apr. 25, 1989

[54] DATA COMMUNICATION APPARATUS FOR DATA AND/OR SPEECH COMMUNICATION ON A PLURALITY OF COMMUNICATION LINES

[75] Inventors: Kenji Kurita; Koichi Matsumoto, both of Tokyo; Toshihiko Nakazawa, Yokohama, all of Japan

[73] Assignee: Canon Kabushiki Kaisha, Tokyo, Japan

[21] Appl. No.: 823,286

[22] Filed: Jan. 28, 1986

[30] Foreign Application Priority Data

| Jan. 31, 1985 | [JP] | Japan | 60-15438 |
| Jan. 31, 1985 | [JP] | Japan | 60-15451 |
| Feb. 5, 1985 | [JP] | Japan | 60-21363 |
| Feb. 5, 1985 | [JP] | Japan | 60-21364 |

[51] Int. Cl.$^4$ .............. H04M 11/00; H04M 1/27; H04N 1/32
[52] U.S. Cl. .............. 379/93; 379/100; 379/355; 358/257
[58] Field of Search .......... 179/2 DP, 18 BD, 18 BE, 179/90 B, 90 BD; 358/257; 379/93, 96, 97, 98, 100, 355

[56] References Cited

U.S. PATENT DOCUMENTS

| 3,803,360 | 4/1974 | Morstadt | 179/2 DP |
| 3,914,539 | 10/1975 | Hashimoto | 358/257 |
| 3,925,622 | 12/1975 | Robinson | 179/18 BE |
| 4,291,198 | 9/1981 | Anderson et al. | 179/2 DP |
| 4,291,200 | 9/1981 | Smith | 179/18 BD |
| 4,530,288 | 3/1985 | Kessler | 179/2 DP |
| 4,578,537 | 3/1986 | Faggin et al. | 179/2 DP |
| 4,596,021 | 6/1986 | Carter et al. | 375/5 |
| 4,640,989 | 2/1987 | Riner et al. | 379/94 |

FOREIGN PATENT DOCUMENTS

| 0082749 | 6/1983 | European Pat. Off. . |
| 0141911 | 5/1985 | European Pat. Off. . |
| 3439867 | 5/1985 | Fed. Rep. of Germany | 379/355 |
| 56-90661 | 7/1981 | Japan | 379/94 |
| 0197951 | 12/1982 | Japan | 379/94 |
| 59-23961 | 2/1984 | Japan | 379/94 |
| 61-181254 | 8/1986 | Japan | 379/93 |
| 1005480 | 9/1965 | United Kingdom . |
| 1245702 | 9/1971 | United Kingdom . |
| 1264576 | 2/1972 | United Kingdom . |

OTHER PUBLICATIONS

Korten, "Modern, Phone Home (and Offices)", PC Products, May 1985, pp. 135-137.
Dudley, "The Integrated Voice-Data Terminal", Communications News, Oct. 1984, pp. 60-62.
Bizcomp, Brochure: "There is Only One PC/XT Modem Designed to Let Both You and Your Computer Talk on the Same Line", Modem introduced in 1983.
Candela Electronics, "Candela Televerter TC-112", Oct. 1980.

Primary Examiner—Keith E. George
Attorney, Agent, or Firm—Fitzpatrick, Cella, Harper & Scinto

[57] ABSTRACT

A communication apparatus includes a data communication unit; a speech communication unit; a connection unit for connecting to a plurality of lines; and a switching unit for selectively connecting the data communication unit and the speech communication unit to any one of the plurality of lines. Both speech and data communication units may be used concurrently. The communication apparatus further includes a memory unit for storing line information identifying a line different from another line in use for data communication or speech communication. An automatic calling to both speech and data communication units may be effected by a single calling operation by the operator.

14 Claims, 23 Drawing Sheets

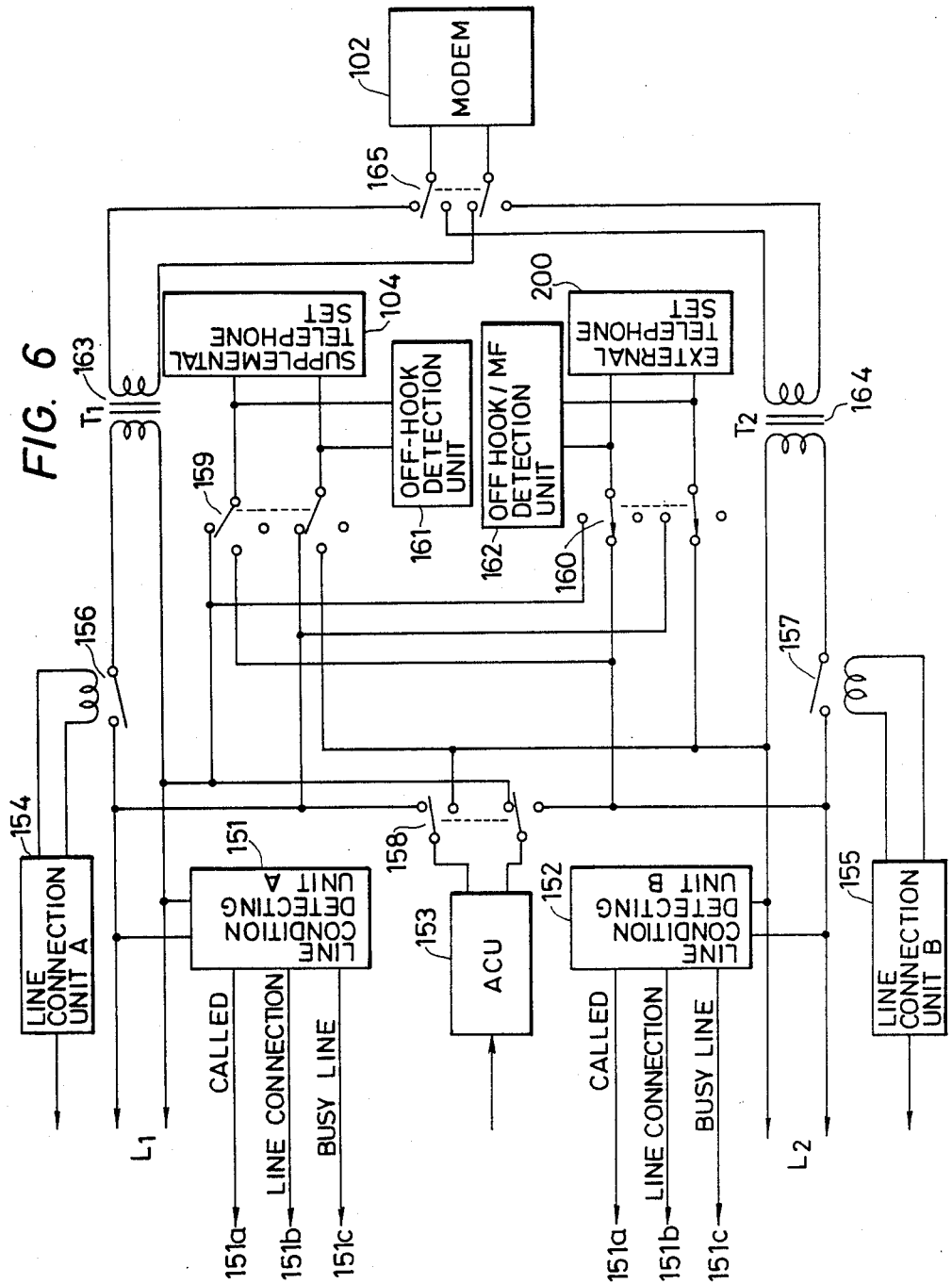

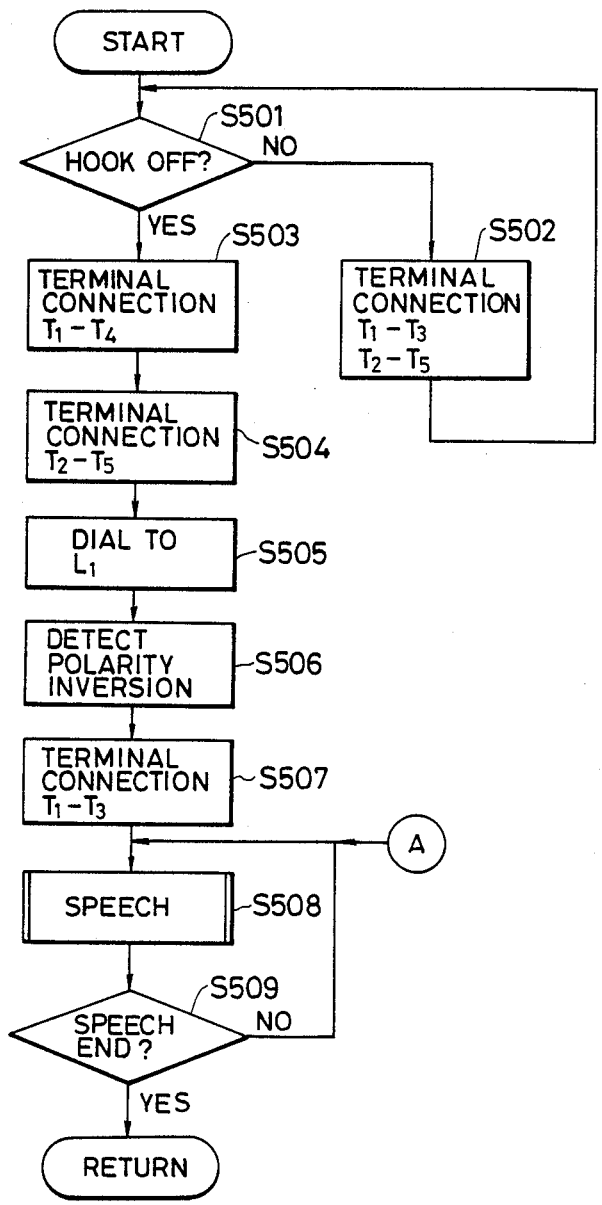

FIG. 10
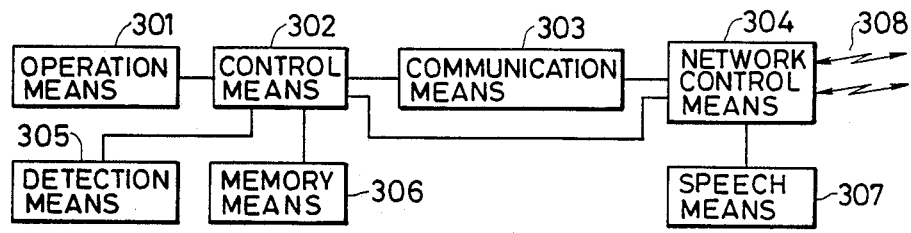
FIG. 11
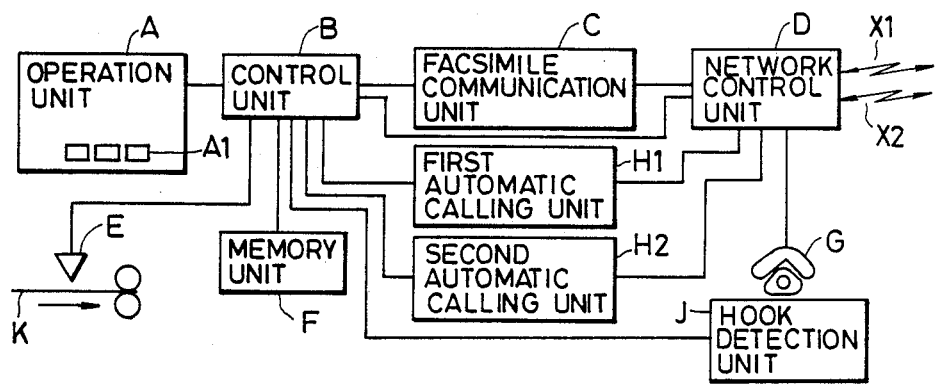
FIG. 12
|  |  | TELEPHONE RECEIVER (HOOK) | |
|---|---|---|---|
|  |  | ON | OFF |
| DOCUMENT (SENSOR) | EXIST | FACSIMILE COMMUNICATION | TELEPHONE SPEECH FACSIMILE COMMUNICATION |
|  | NONE |  | TELEPHONE SPEECH |

DATA COMMUNICATION APPARATUS FOR DATA AND/OR SPEECH COMMUNICATION ON A PLURALITY OF COMMUNICATION LINES

BACKGROUND OF THE INVENTION

1. Field of the Invention

The present invention relates to a communication apparatus provided with communication means for data communication and speech means for having speech communication.

2. Description of the Prior Art

Of communication apparatus of this type having a function which permits the operator to communicate orally with a partner as well as a data communication function, there is known in the art a facsimile apparatus, for example.

Such facsimile apparatus are mainly divided into automatic response type apparatus and manual response type apparatus.

In receiving operation using the manual response type facsimile apparatus, when a telephone call is received, first, the handset of a telephone set connected to the apparatus is picked up for conversation, as usual. Thereafter, if image communication is desired, a switch provided on the apparatus for initiating image communication is depressed to start the apparatus. By doing so, the network line is switched from the telephone set to the facsimile apparatus to effect communication operations at both parties' facsimile apparatus.

Similar operation is conducted at the side of a calling party. After making conversation as usual by the telephone, the switch is actuated, if image communication is desired, to start both parties' facsimile apparatus.

On the other hand, if the automatic response type facsimile apparatus is used, image communication is automatically performed in accordance with the predetermined control procedure to be effected after connection to the apparatus. Therefore, there occurs no conversation between the parties. There is known apparatus of a different type capable of permitting conversation. With this apparatus, however, image communication is interrupted during conversation.

As such, known facsimile apparatus are used by switching between an image communication state and a speech state. Therefore, there is a drawback that it is impossible to have both image and speech communication at one time.

SUMMARY OF THE INVENTION

It is an object of the invention to eliminate the above drawback and improve a communication apparatus.

It is another object of the present invention to provide a communication apparatus capable of concurrently or selectively performing a speech function and a data communication function.

It is a still another object of the present invention to provide a data communication apparatus capable of readily permitting speech with a communication partner or a called party.

It is a still another object of the present invention to provide a communication apparatus capable of permitting speech and data communication with a partner or a called party using at least two communication lines.

It is a still another object of the present invention to provide a communication apparatus capable of sending a selection signal to at least two communication lines.

Other objects of the present invention will become apparent from the following description of the preferred embodiments and appended claims, with reference to the accompanying drawings.

BRIEF DESCRIPTION OF THE DRAWINGS

FIG. 6 is a block diagram showing the network control unit circuitry of FIG. 5;

FIGS. 9A and 9B are flow charts showing control operations of the third embodiment;

FIGS. 10 and 11 are block diagrams showing the whole arrangement of a fourth embodiment of the communication apparatus;

FIG. 12 shows operations of the fourth embodiment;

DETAILED DESCRIPTION OF THE PREFERRED EMBODIMENTS

The preferred embodiments of the present invention will now be described with reference to the accompanying drawings.

Figure 1:
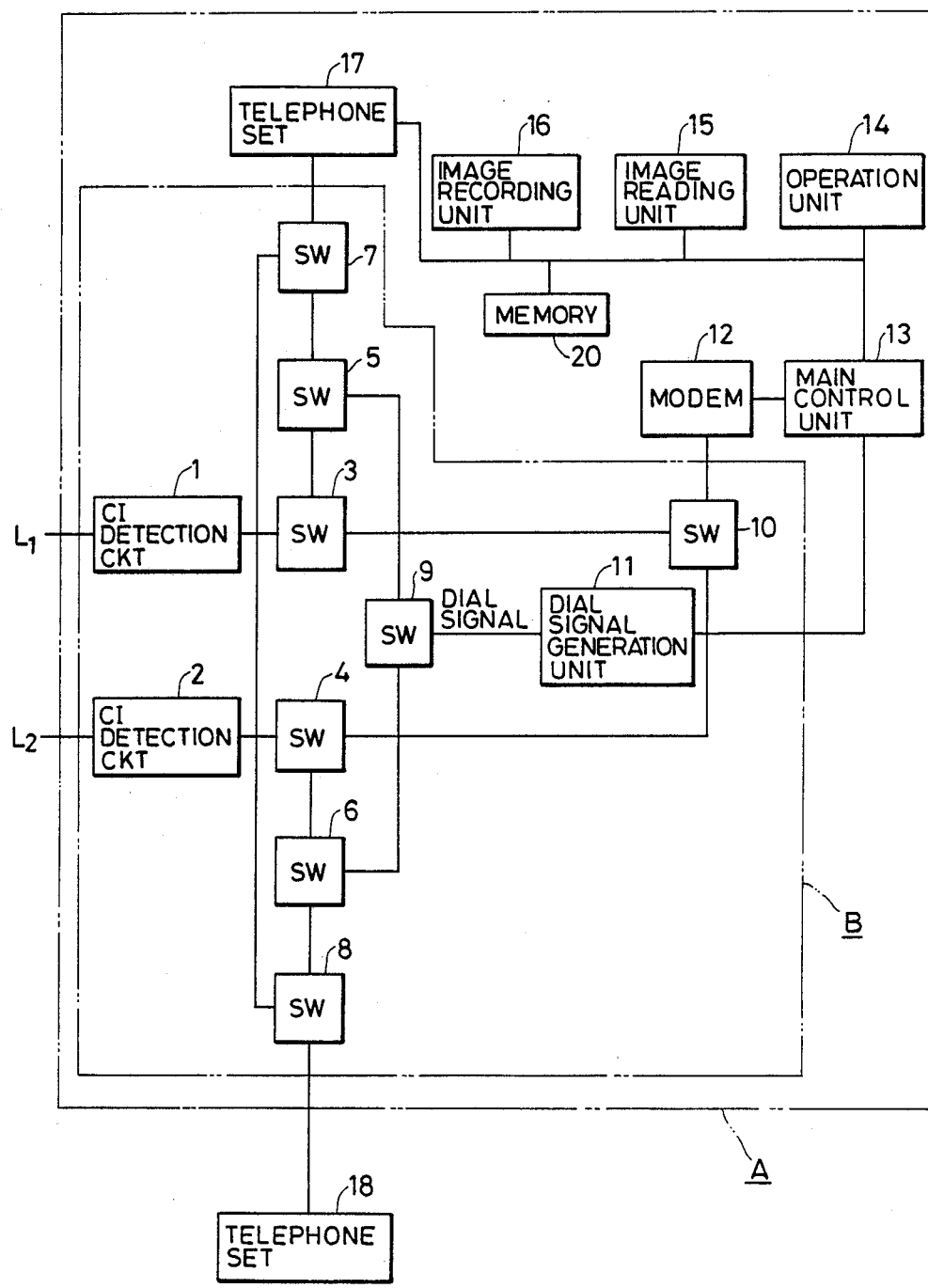
FIG. 1 is a block diagram showing the whole arrangement of a first embodiment of the communication apparatus according to the present invention.

FIG. 1 is a block diagram showing a facsimile apparatus according to a first embodiment of the present invention.

In the figure, reference A indicates the whole system of the facsimile, B indicates a network control unit, L1 and L2 represent telephone network lines.

Reference numerals 1 and 2 denote signal detection circuits (hereinafter called CI detection circuit) connected to the corresponding telephone lines. The CI detection circuits 1 and 2 detect an on-hook/off-hook state of a handset (i.e., if the hand set is picked up or not) and a calling signal obtained from the line, and inform a main control unit 13, to be described later, of such state. The CI detection circuits 1 and 2 are known and used in ordinary facsimile apparatus.

A dial signal generation unit 11 is constructed of a known dial circuit outputting dial pulses or dial tone signal to the telephone lines L1 and L2 in accordance with dial data outputted from the main control unit 13. A modem 12 modulates and demodulates data. The modem 12 is constructed of a known modulation and demodulation circuit used in ordinary facsimile apparatus. The main control unit 13 controls the whole system of the facsimile apparatus and is constructed of a microprocessor and its associated circuitry such as ROM, RAM and so on. An operation unit 14 is for operating the facsimile apparatus. The operation unit 14 is constructed of a plurality of key switches, including dial buttons, and a display such as a liquid crystal for displaying a partner telephone number, name, and set mode of the apparatus, and so on. An image reading unit 15 used in ordinary facsimile apparatus is provided with such as a CCD line sensor. An image recording unit 16 used in ordinary facsimile apparatus is provided with such as a thermal printer. A telephone set 17 is provided with a handset and a calling bell (its dial buttons are included in the operation unit 14). A usual telephone set 18 is connected to and located externally of the apparatus. Switch units 3 to 10 (hereinafter abbreviated as SW) perform switch operations in response to signals outputted from the main control unit 13. SW3 and SW4 switch the circuits on the sides of the telephone set 17, 18 and the modem 12. SW5 and SW6 switch the circuits on the sides of the telephone set 17, 18 and the dial signal generation unit 11. SW7 and SW8 switch the telephone set 17 to the line L2, and the telephone set 18 to the line L1, respectively. SW9 is for selectively delivering the dial signal outputted from the dial signal generation unit 11 to either one of the lines L1 and L2. SW10 is for connecting the modem 12 to either one of the lines L1 and L2. A memory 20 stores telephone numbers which will be described later in detail.

Next, the operation of the first embodiment will be described.

(1) First, a general description of the operation of the first embodiment will be given.

The line L1 is connected in the ordinary state to the circuit on the side of the telephone set 17, via the CI detection circuit 1, SW3, SW5 and SW7. On the other hand, the line L2 is connected in the ordinary state to the circuit on the side of the telephone set 18, via the CI detection circuit 2, SW6 and SW8.

Upon reception of a calling signal from the line L1, the bell of the telephone set 17 rings. As the handset is picked up (i.e., in an off-hook state) at that time, the line L1 is used to enable the operator to speak with the partner. If an image communication is desired after the speech, a start button (not shown) provided on the operation unit 14 is depressed. Specifically, upon depression of the start button, the line L1 is switched to connect the modem 12 by means of SW3. SW10 is also switched to connect SW3 to the modem 12. With the modem 12 connected to the line L1 as above, the modem 12 starts receiving and sending the predetermined procedure signals for image communication with the partner facsimile apparatus.

Received signals from the line L1 are demodulated by the modem 12, and demodulated data is decoded by the main control unit 13 to transfer it to the image recording unit 15 for recording on a record paper.

In contrast, a document to be transmitted is read out by the image reading unit 16, and read-out data is sent to the line L1 via the modem 12.

In the case that the facsimile apparatus of the first embodiment is set at an automatic reception mode, a calling signal is detected by the CI detection circuit 1. In response to the detection signal, the main control unit 13 actuates SW3 and SW10 to connect the line L1 to the modem 12. Thereafter, in accordance with the known control procedure, the communication operation starts automatically.

Operation similar to that of the line L1 can be effected on the side of the line L2. In particular, as a calling signal from the line L2 is received, the bell of the telephone set 18 rings. The telephone set 18 is usually located remotely from the facsimile apparatus. In such a case, if the telephone set 18 is of a push-button type, a push-botton is depressed to generate a tone signal which is detected by a tone detector (not shown). Upon judgement or discrimination that a tone has been generated, the main control unit 13 switches SW4 to connect the line L2 to SW10 which in turn connect the line L2 to the modem 12. Thereafter, the operation of image communication starts.

(2) Next, the operation will be described for sending a speech using the facsimile apparatus.

First, a hook button (not shown) mounted on the operation unit 14 is depressed, or the handset of the telephone set 17 is picked up, to confirm a line tone signal. Thereafter, dial buttons on the operation unit 14 are sequentially depressed.

The main control unit 13 receives dial button data from the operation unit 14 and actuates the dial signal generation unit 11 to generate a dial signal.

Simultaneously with the depression of the dial buttons, SW9 is switched to connect the dial signal generation unit 11 to SW5. SW5 is switched to connect SW3 to SW9. With these switching operations, the dial signal is delivered to the line L1 via SW9, SW5, SW3 and the CI detection circuit 1.

The dial signal may be delivered to the line L2. In this case, the dial signal is delivered to the line L2 via SW9, SW6, SW4 and the CI detection circuit 2. The CI detection circuit 2 checks the hook state of the telephone set 18 (i.e., if it is an on-hook or off-hook state), to determine whether the line L2 can be used or not.

(3) In the case that image communication is desired after dialing by the facsimile apparatus, first, dialing either onto the line L1 or L2 is effected in accordance with the above dialing procedure. After confirming that the partner has responded to the calling, SW3 is switched to the modem 12. The main control unit 13 makes SW10 switch to the connected line and thereafter the image communication operation follows with the aid of the modem 12.

(4) With the facsimile apparatus, dialing during transference of image data is also possible.

Assuming here that image communication is being performed via the line L1, the line L1 is connected to the modem 12 via the CI detection circuit 1, SW3 and SW10. In this case, the line L1 and the telephone set 17 are not connected. Therefore, if the line L2 is idle, a speech may be had via the line L2.

To realize speech concurrently with image communication, SW7 and SW8 are used. In particular, upon depression of the dial buttons on the operation unit 14 after picking up the handset of the telephone set 17, the main control unit 13 monitors the line L2 using the CI detection circuit 2 for execution of the speech procedure. If the line L2 is idle, the main control unit 13 switches SW7 and SW8 to connect the telephone set 17 to the line L2 via SW7, SW8, SW6, SW4 and the CI detection circuit 2, and the telephone set 18 is caused to be disconnected from the line L2. Furthermore, SW6 and SW9 are switched to deliver the dial signal generated from the dial signal generation unit 11 onto the line L2, via SW9, SW6, SW4 and the CI detection circuit 2.

Similarly, if that image communication is being performed with the line L2 connected to the modem 12 via the CI detection circuit 2, SW4 and SW10, it is possible to have speech communication by using the telephone set 17 on condition that the line L1 is idle. In particular, upon depression of the dial buttons, and after confirming an idle state of the line L1, the dial signal from the dial signal generation unit 11 is delivered onto the line L1 via SW9, SW5, SW3 and the CI detection circuit 1. Next, after the partner responds and polarity inversion of the line L1 is checked by the CI detection circuit 1, SW5 is switched to make the line L1 connect to the telephone set 17 via the CI detection circuit 1, SW3, SW5 and SW7.

Alternatively, it is also possible to have a conversation by using the telephone set 18. In this case, after confirming the depression of the dial buttons, an idle state of the line is checked to connect the line L1 to the telephone set 18 via SW8, SW7, SW5, SW3 and the CI detection circuit 1. In this case dialing is conducted using the telephone set 18.

Figure 2A:
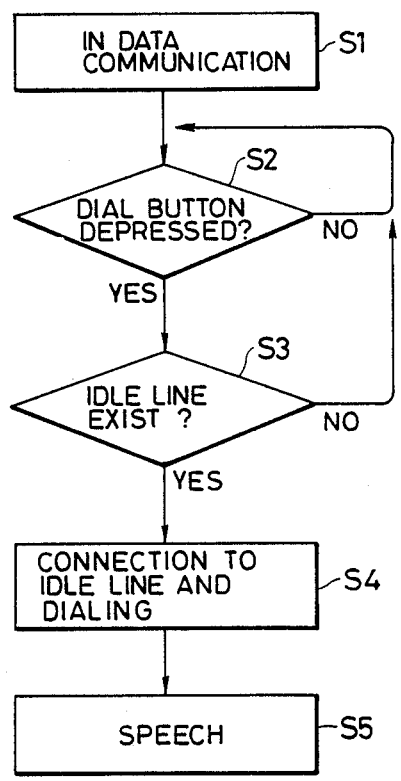
FIGS. 2A to 2E, FIGS. 3A, 3B and FIG. 4 are flow charts showing control operations of the first embodiment.

FIG. 2A briefly shows the above-described control procedure for concurrently performing image communication and speech communication. In particular, in the case that an image communication is being performed using one of the lines (step S1), the main control unit 13 determines (step S2) that speech is desired, if the dial buttons are depressed after picking up the handset of the telephone set 17 or 18. The main control unit 13 checks (step S3) an idle state of the other of the lines by using either the CI detection circuit 1 or 2. Thereafter, dialing onto the idle line is effected (step S4) by the dial signal generation unit 11 via the determined switches to make a speech (step S5).

(5) While image communication is being performed by the facsimile apparatus using one of the lines, it is possible to have a conversation by using either of the telephone sets 17 and 18 if a call on the other of the lines is received.

Assuming that a call on the line L2 is received during image communication via the line L1, audible ringing is generated from the telephone set 18. In this case, it is possible to have a speech by picking up the handset of the telephone set 18 as well as that of the telephone set 17. In particular, the main control unit 13 judges that the handset of the telephone set 17 has been picked up. Then, SW8 and SW7 are switched to connect the line L2 to the telephone set 17 to enable a speech.

Similarly, in the case that a dialing on the line L1 is received during image communication via the line L2, audible ringing is generated from the telephone set 17 mounted on the facsimile apparatus. It is possible to have a conversation by picking up the handset of the telephone set 17. Alternatively, in the case that the handset of the telephone set remote from the facsimile apparatus is picked up, the main control unit 13 is informed of such state and makes it possible to connect the line L1 to the telephone set 18 by switching SW7 and SW8.

Figure 2B:
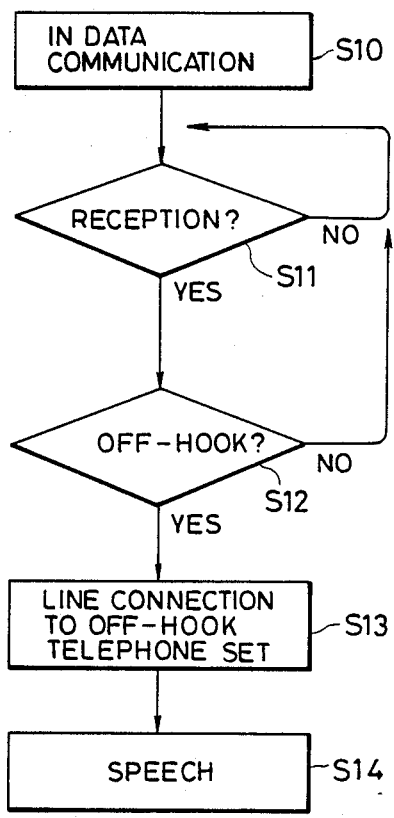

FIG. 2B is a flow chart briefly illustrating the above-described control procedure. In particular, in the case that an image communication is performed (step S10) via one of the lines, and if a call is received (step S11) on the other of the lines, the main control unit 13 checks (step S12) an off-hook state of one of the telephone sets. The telephone set in an off-hook state is connected (step S13) to the line via the determined switches to permit conversation (step S14).

(6) With the facsimile apparatus, even if the telephone set mounted on the facsimile apparatus is in use via one of the lines, it is possible to perform image communication via the other of the lines.

It is assumed here that the telephone set 17 is connected to the line L1 and is in use. If a document is desired to be sent by using the facsimile apparatus, first the document is set on the image reading unit 15 and the operator depresses the dial buttons. Upon detection by the main control unit 13, and after confirmation of an idle state of the line L2, a dial signal from the dial signal generation unit 11 is delivered onto the line L2 via SW9, SW6, SW4 and the CI detection circuit 2. If the partner responds to the call, the line L2 is caused to be connected to the modem 12 via the CI detection circuit 2, SW4 and SW10 to thereby enable to start image communication.

Figure 2C:
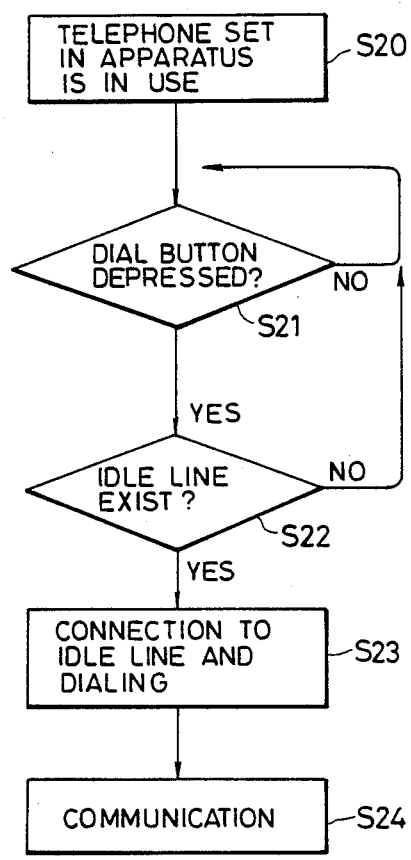

FIG. 2C is a flow chart briefly illustrating the above-described control procedure. In particular, during a speech communication via the telephone set 17 mounted on the facsimile apparatus via one of the lines (step S20), the dial buttons on the operation unit 14 are depressed after a document is set. Upon depression of the dial buttons (step S21), the main control unit 13 detects it and judges that a communication is desired, and checks (step S22) an idle state of the other of the lines. A call on the line in an idle state is effected (step S23). If a response from the partner is received, it is possible to start image communication with the aid of the modem 12 (step S24).

(7) With the facsimile apparatus, even if the telephone set mounted on the facsimile apparatus is in use via one of the lines, image communication can be effected upon reception of a call on the other of the lines.

For instance, it is assumed that the telephone set 17 mounted on the facsimile apparatus is connected to the line L1 and is in use and that a call is received on the line L2. In such a case, the facsimile apparatus starts the reception operation on condition that the line L2 is set at an automatic reception mode. Alternatively, the reception operation may be effected by depressing a reception button on the operation unit 14.

Figure 2D:
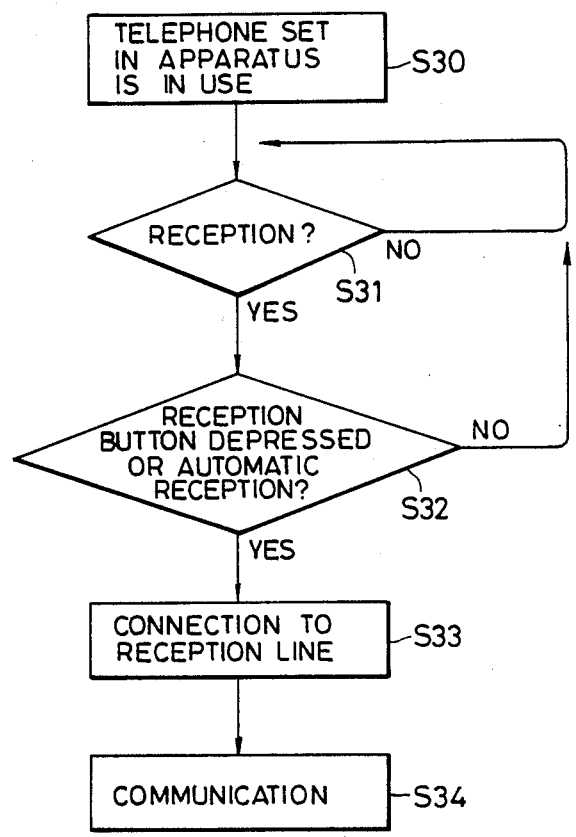

FIG. 2D is a flow chart briefly illustrating the above-described control procedure. In particular, it is assumed that the telephone set 18 on the facsimile apparatus is in use via one of the lines (step S30), and that a call is received on the other of the lines (step S31). If the facsimile apparatus is set at an automatic reception mode, or if the reception button is manually depressed (step S32), then the modem 12 is connected to the reception line via the determined switches (step S33) to conduct image communication (step S34).

(8) From the foregoing, it will be apparent that concurrent speech and image communications are possible using two lines. Apart from that, it is annoying to memorize the telephone numbers for both speech and image communication.

In the above concern, a control procedure for the telephone numbers during concurrent speech and image communications using two lines, will be described. The control procedure is aimed at simplifying the operation procedure performed by the user and improving its operability.

For a partner (or called party) frequently contacted over the facsimile apparatus, a pair of telephone numbers of the first telephone set, and the second telephone set or an additional telephone set located near the facsimile for speech communication purpose, are stored beforehand in the memory 20 (refer to FIG. 1). When a speech communication becomes necessary during an image communication, or vice versa, an operation key (not shown) on the operation unit 14 is depressed or the handset of the telephone set 17 is picked up (i.e., to obtain an off-hook state), or another similar operation is carried out. With such an operation, it is possible to refer to the second telephone number of the partner stored in the memory and automatically call the second telephone set (by using the other idle line) for performing both image and speech communication.

Figure 2E:
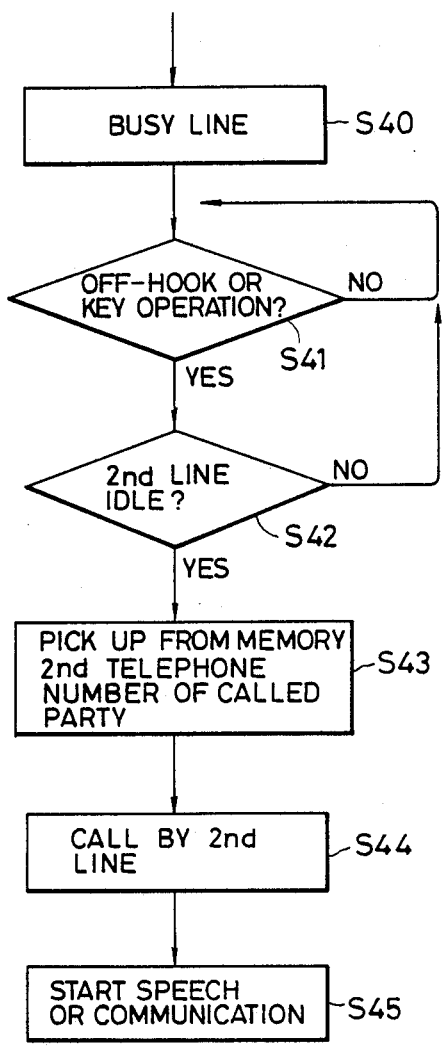

FIG. 2E is a flow chart according to which such a function can be realized. In particular, during speech or image communication via one of the lines (step S40), the telephone set 17 is rendered into an off-hook state or the operation key on the operation unit 14 is actuated (step S41). After confirmation of an idle state of the other line by the main control unit 13 (step S41), the main control unit 13 reads out of the memory the second telephone number of the partner (step S43) to initiate a call via the other line (step S44). If the partner responds to the call, speech or image communication starts (step S45).

(9) Auto dialing the partner may be effected by executing the control procedure described with FIG. 2E or by using an optional signal.

In general, a procedure signal is used during communication in accordance with Recommendation T-30 of CCITT. To meet the requirement of specific users outside of that Recommendation, an optional signal has been used. To this end, in the present facsimile apparatus, an NSF (Non-Standard Facilities) or NSS (Non-Standard Facilities Set-up) signal is used as the optional signal. In particular, the other (second) telephone number not used in image communication is inserted in an FIF (Facsimile Information Field) for NSF or NSS and thereafter transmitted. The partner stores beforehand in the memory the content of information inserted in FIF. Thus, as described at step S41 of FIG. 2E, in response to an off-hook state of the telephone set or to an actuation of the operation key on the operation unit 14, information on the telephone number previously stored in the memory is read out to effect an automatic dialing to the partner. As a result, a speech communication through automatic dialing becomes possible during image communication.

Figure 3A:
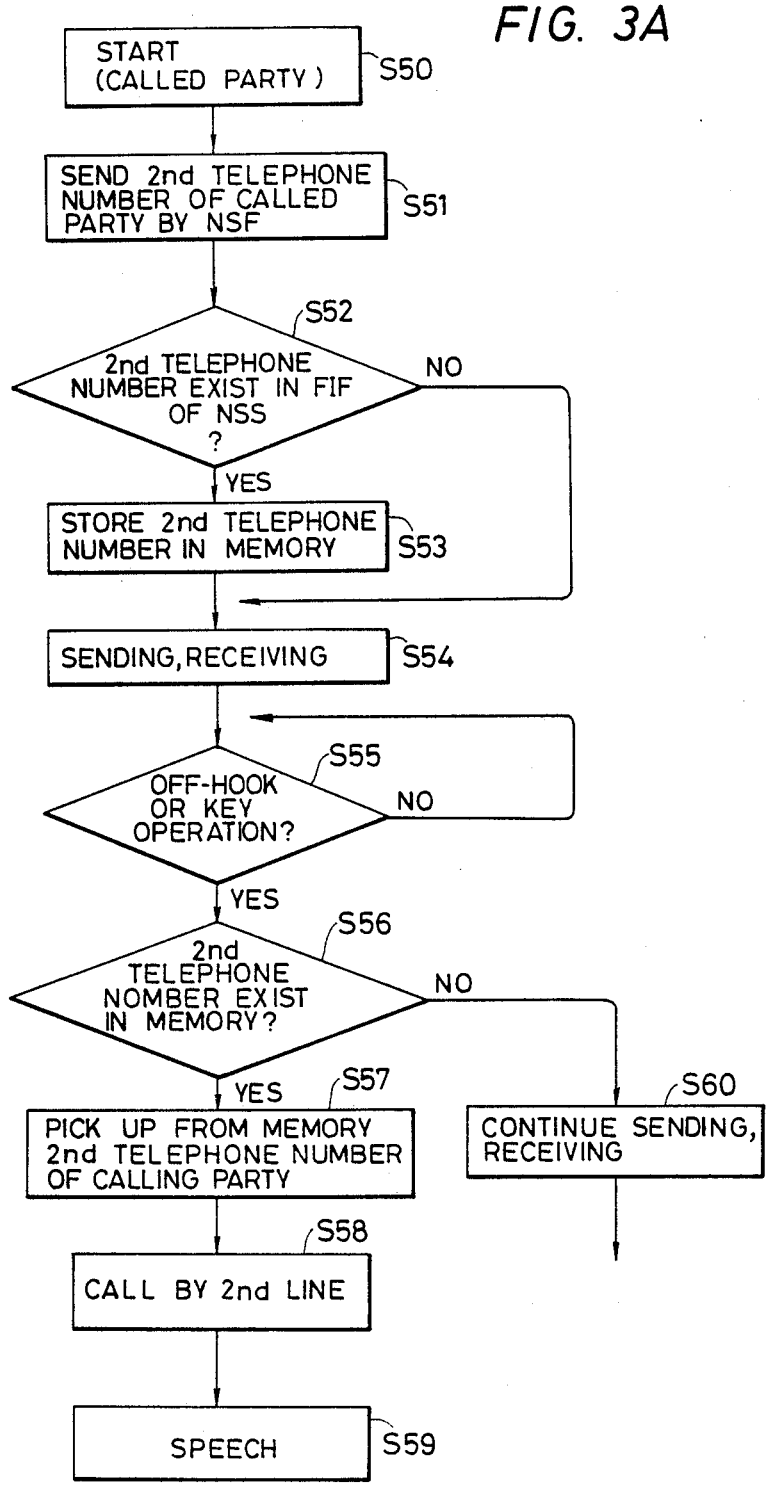
Figure 3B:
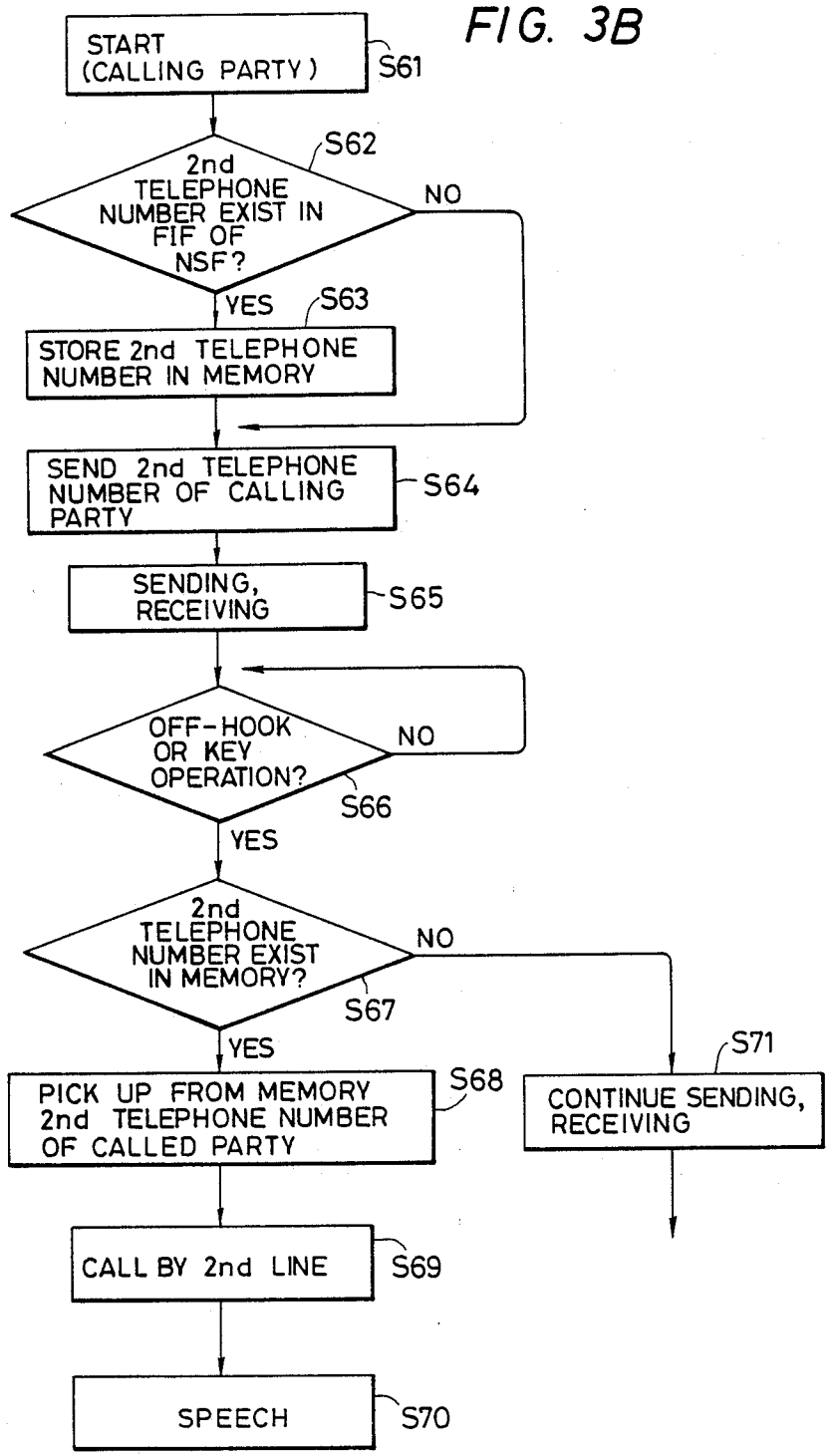

FIGS. 3A and 3B are flow charts illustrating in detail the control procedure.

FIG. 3A shows the control procedure at a called party. In particular, at the start of the communication procedure (step S50), the calling party is informed of the second (idle) telephone number of the called party by NSF (step S51). Next, it is checked if the second (idle) telephone number is included in FIF of NSS sent by the calling party (step S52). If present, the second telephone number of the called party is stored in the memory of the called party's facsimile apparatus (step S53). Next, sending and or receiving starts (step S54). During the communication, if the telephone set is rendered into an off-hook state or a key actuation at the operation unit 14 is effected (e.g., depression of a hook button) (step S55), then the idle telephone number, previously stored in the memory, of the partner (calling party) is read out (steps S56 and S57) to initiate an automatic dialing via the idle line (step S58). Thereafter, a speech communication is conducted (step S59). However, even with an off-hook state of the telephone set or the depression of the hook button (step S55), if the second telephone number of the partner is not stored in the memory, the communication continues as it is and an automatic dialing is not performed (step S60).

FIG. 3B shows the control procedure at a calling party. In particular, at the start of the communication procedure (step S61), first it is checked if the second (idle) telephone number of the called party is included in FIF of NSF (step S62). In the presence of the second telephone number of the called party in FIF, the content is stored in the memory of the calling party's facsimile apparatus (step S63). Next, the second (idle) telephone number of the calling party is sent to the called party using NSS (step S64). Thereafter, sending and or receiving starts (step S65). During the communication, if the telephone set is rendered in an off-hook state, or a key actuation at the operation unit 14 is effected (e.g., depression of the hook button) (step S66), then the idle telephone number, previously stored in the memory, of the partner (called party) is read out (steps S67 and S68) to effect an automatic dialing to the idle line (step S69). Thus, a concurrent speech communication is possible during the data communication (step S70). However, even with an off-hook state of the telephone set or a depression of the hook button (step S66), if the second telephone number of the partner is not stored, then the communication continues as it is and an automatic dialing is not performed (step S71), similarly to the case at step S60 shown in FIG. 3A.

(10) Next, the control procedure of an automatic reception using the facsimile apparatus will be described. For instance, if a call is received on the line L1, first, the CI detection circuit 1 detects a calling signal and inform the main control unit 13 of such state. The main control unit 13 determines if the reception mode is an automatic mode or a manual mode. In the case of the automatic mode, SW3 is closed to switch SW10 for connection to the modem 12, and a communication starts.

Alternatively, in the case of a reception on the line L2, similarly to the above, the modem 12 and the line L2 are connected together via the CI detection circuit 2, SW 4 and SW10 to start a communication.

Figure 4:
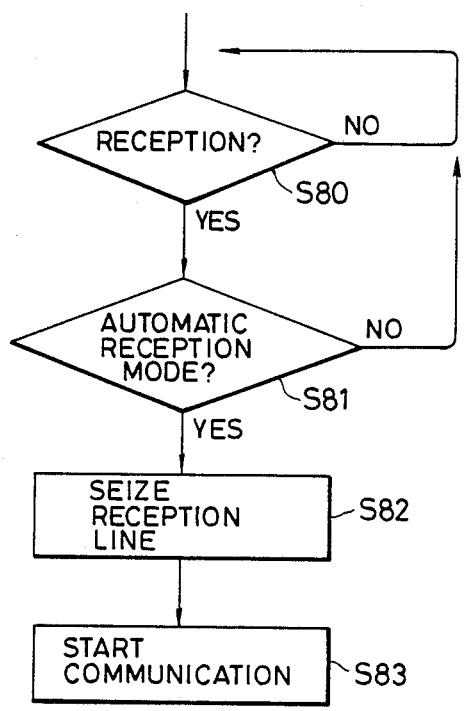

FIG. 4 is a flow chart briefly illustrating the control procedure. In particular, the CI detection circuit 1 or 2 confirms that a reception (step S80), and the main control unit 13 confirms the facsimile apparatus is set at the automatic mode. Thereafter, the reception line is seized (steps S81 and S82) to start a communication (step S83).

(11) Since the facsimile apparatus is provided with the CI detection circuits independently for the respective lines L1 and L2, mode setting either of the automatic reception or manual reception for each line can be performed independently. As a result, it is possible to use one of the lines exclusively in the manual mode, and the other of the lines exclusively in the automatic mode.

In general, while the automatic reception mode is set, a reception operation starts without any manual work when a calling is received. Therefore, the user frequently using the facsimile apparatus for image communication purpose, often makes one of the lines for exclusive use in image communication.

In contrast, the user frequently using the facsimile apparatus not for image communication purpose but for speech communication purpose, often sets the facsimile apparatus at the manual reception mode.

In view of the above, it is common to selectively change the automatic/manual mode depending upon whether the facsimile apparatus is used for the purpose of speech communication or for image communication. Furthermore, it is common for a person to call a telephone after confirming if the telephone number to be used is for the speech communication or for the image communication.

Thus, according to the first embodiment, both advantages of the facsimile apparatus arranged for exclusive use in the automatic reception and for use in the manual reception, are available. Furthermore, it is not necessary to prepare two conventional facsimile apparatuses.

Furthermore, by setting both lines for use in an automatic reception mode before leaving an office or the like, image communication can be reliably performed when a call on any one of the lines is received.

In the above-described embodiment, although the telephone set 17 has been integrally formed with the facsimile apparatus, it is also possible to use the usual separate telephone set as the telephone set 17.

Also in the above-described embodiment, although both functions of image and speech communications have been attained, a general data communication function instead of the image communication function may be attained.

Furthermore, in the above embodiment, the number of lines has been set at two. However, it is obvious that three or more lines may be used under somewhat more-complicated switch control.

As seen from the foregoing description of the first embodiment, concurrent use of a communication apparatus and its annexed telephone set is achieved by properly switching the connections between a plurality of lines, and the communication apparatus and its annexed telephone set. Therefore, it is possible to provide a communication apparatus capable of performing an effective operation mode.

Specifically, for an office, company or the like using a plurality of telephone sets, it is possible to have an image or data communication function without preparing an additional line, merely by connecting the presently using telephone line to the communication apparatus of the first embodiment.

Next, a second embodiment of the present invention will be described. Although the second embodiment has similar construction and function to those of the first embodiment, several points differ in the arrangement of the network control unit.

Figure 5:
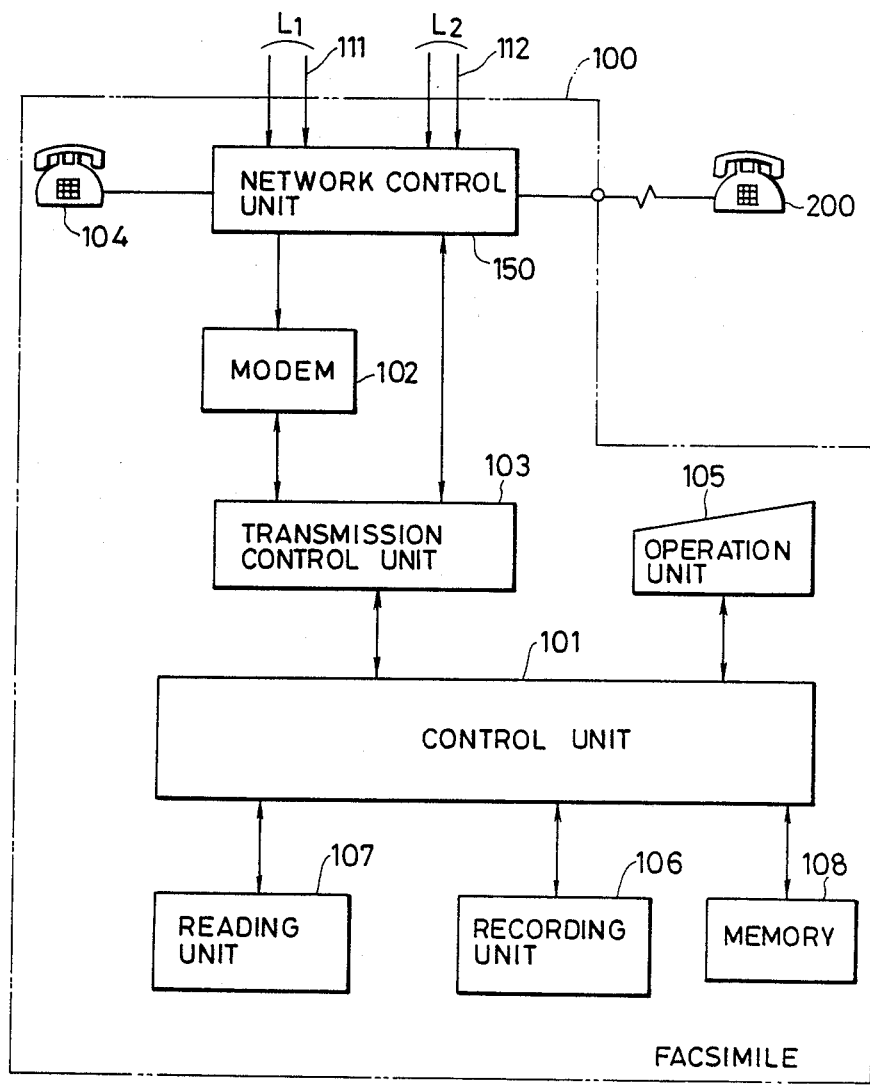
FIG. 5 is a block diagram showing the whole arrangement of a second embodiment of the communication apparatus.
Figure 7A:
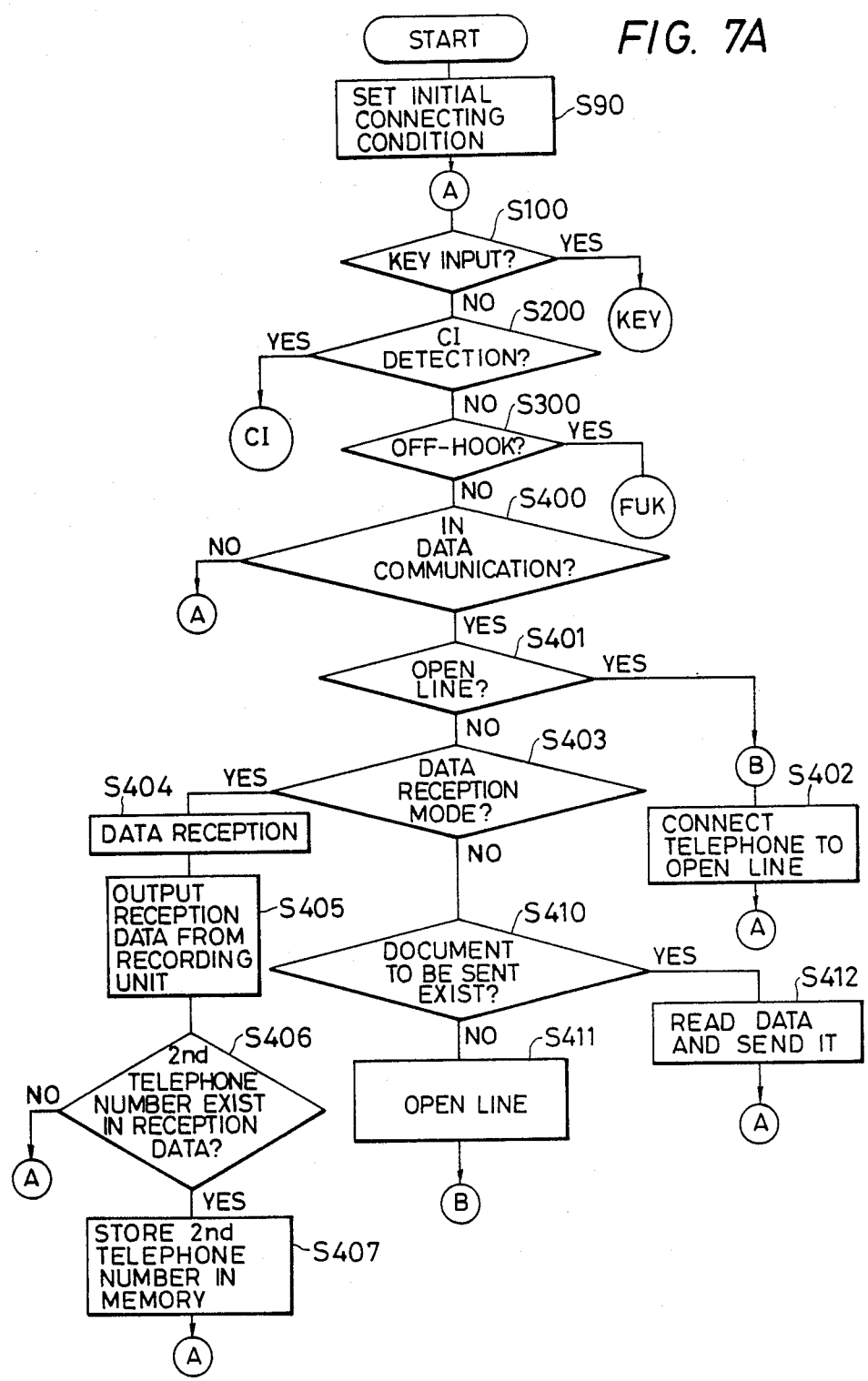
FIGS. 7A to 7D are flow charts showing control operations of the second embodiment.
Figure 7B:
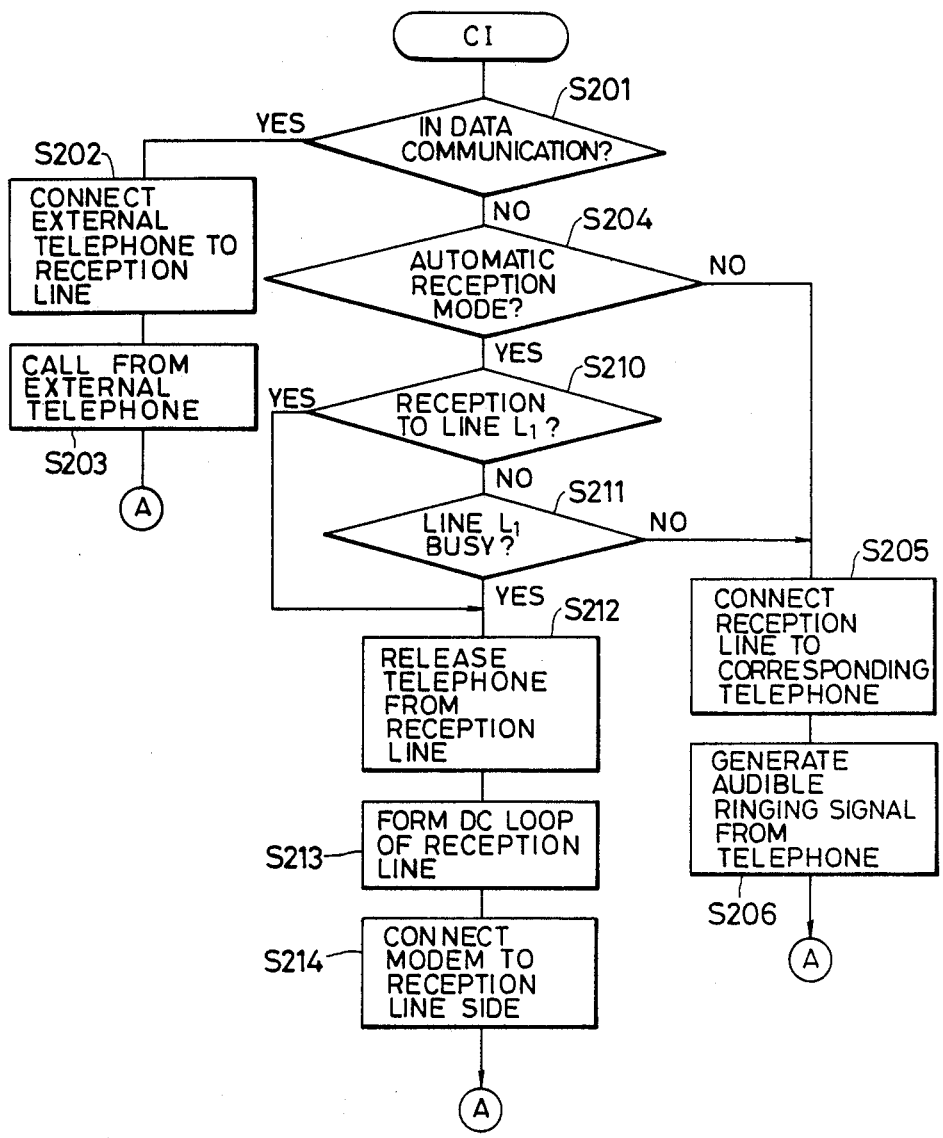
Figures 1, 7C:
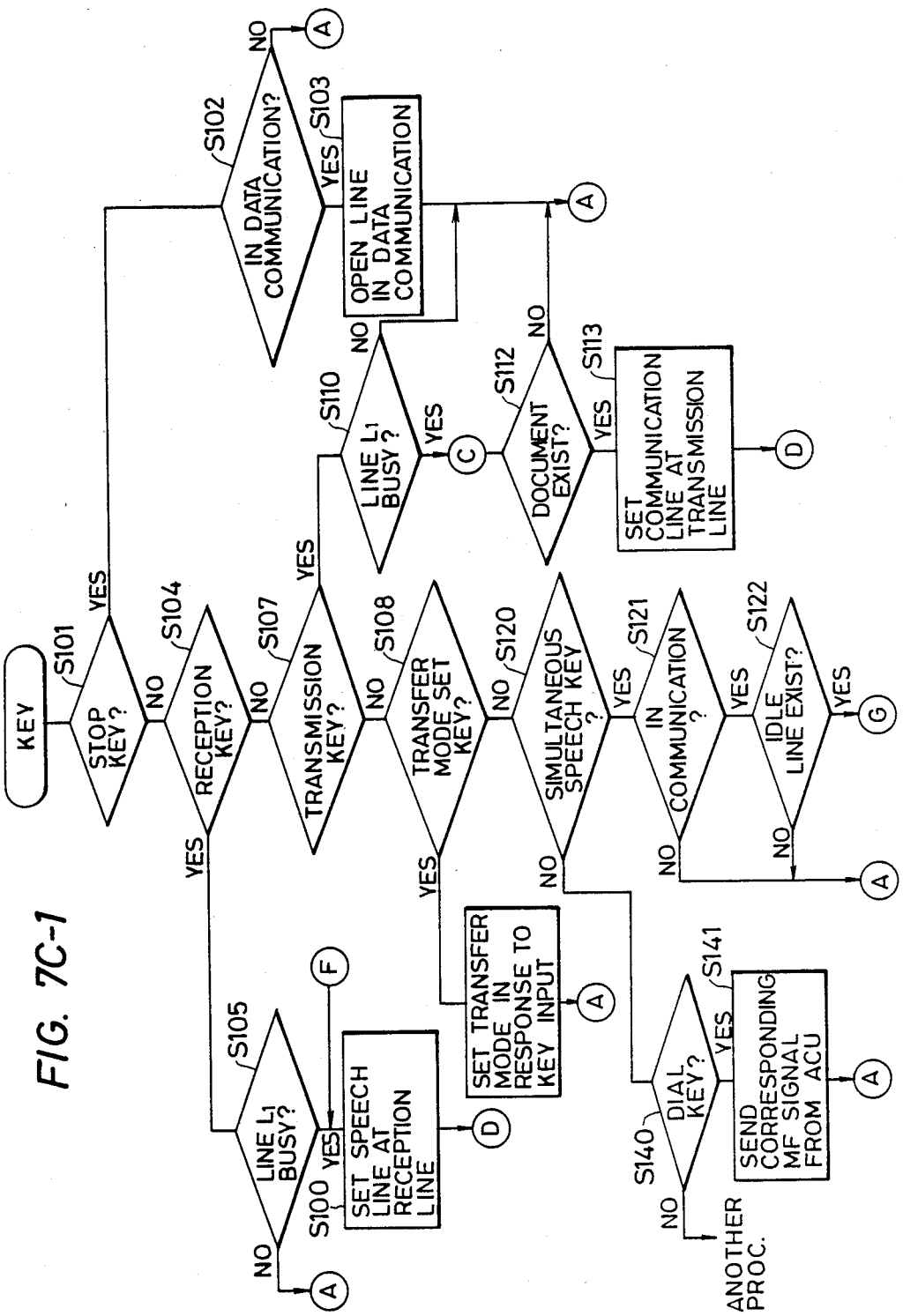
Figures 2, 7C:
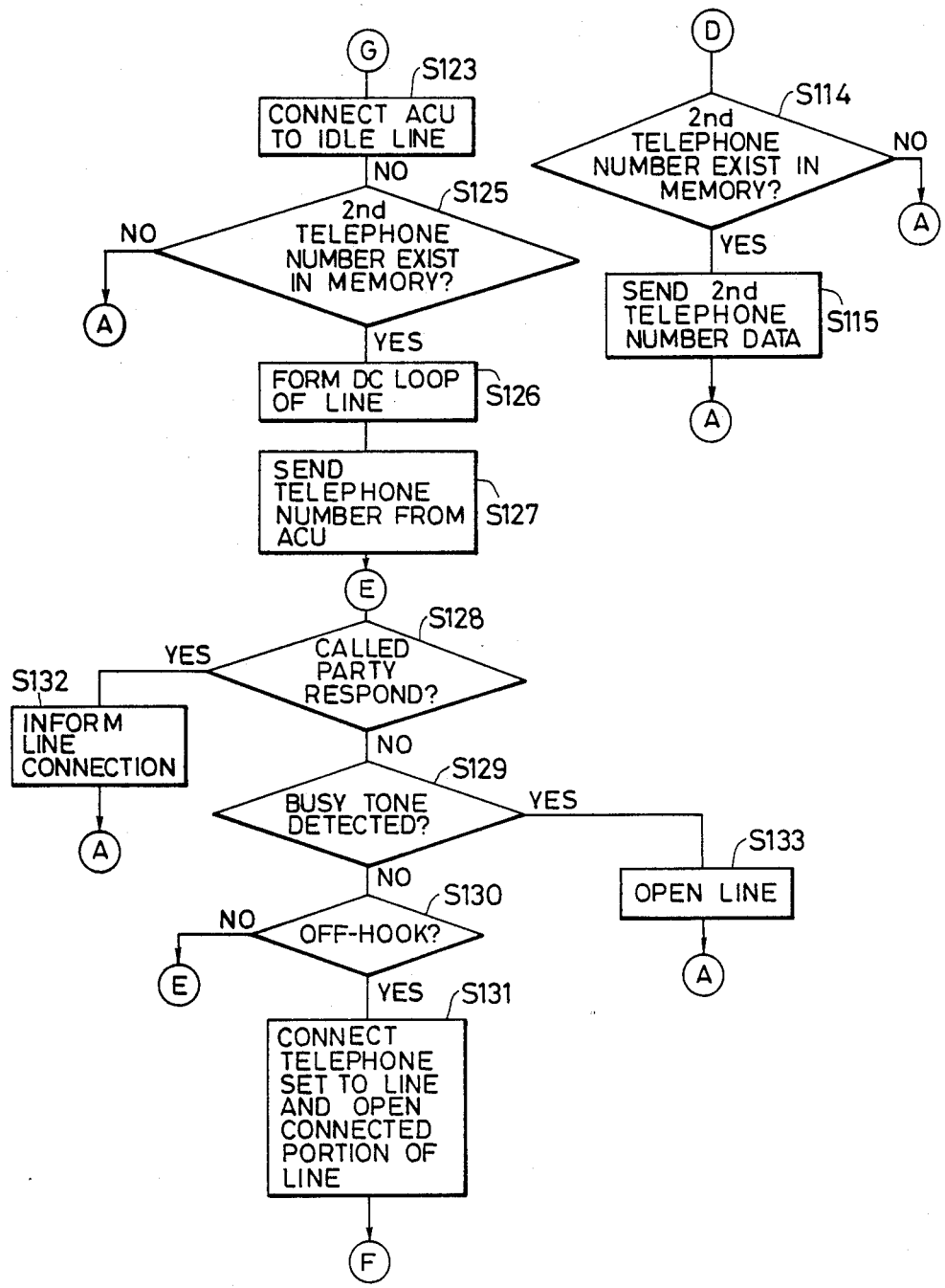
Figure 7D:
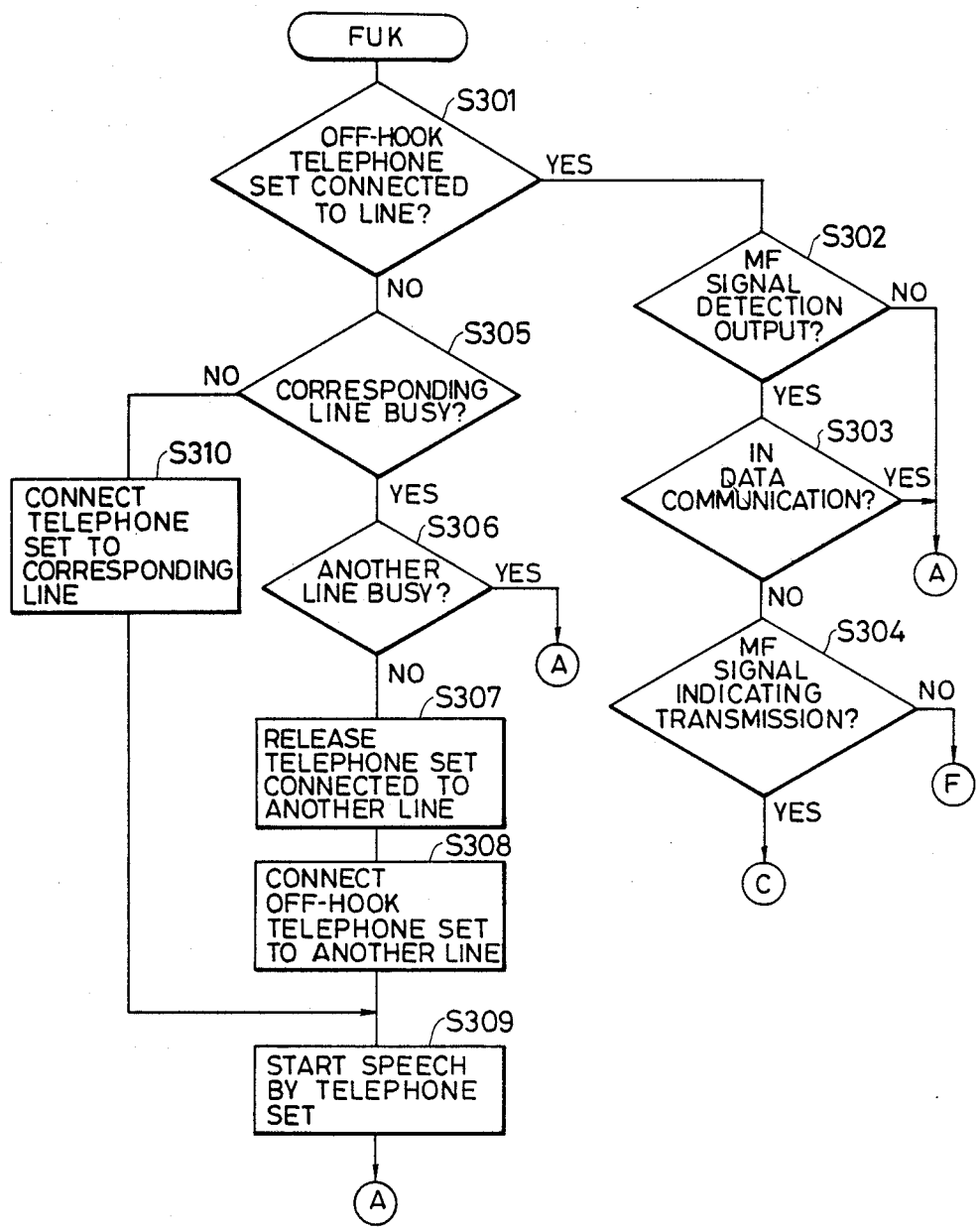

FIG. 5 is a block diagram showing a second preferred embodiment of a facsimile apparatus according to the present invention. In the figure, reference numeral 100 indicates the facsimile apparatus. A control unit 101 controls the whole system of the facsimile apparatus 100. The control unit 100 is constructed of a microprocessor, memories and the like. Reference numeral 102 represents a modem. A transmission control unit 103 controls the network control unit 150 and data transference. A telephone set 104 is annexed to (built in) the facsimile apparatus. An operation unit 105 is for inputting various instruction. A recording unit 106 records data to be transferred or read-out data by a reading unit 107 which reads a document and so on. A memory 108 temporarily stores communication data to and from network lines and processed data by the control unit 101. Reference numeral 150 denotes a network control unit, and reference numerals 111 and 112 denote telephone line L1 and L2 respectively. Reference numeral 200 is an external telephone set mounted externally of the facsimile apparatus. A modem 102, operation unit 105, reading unit 107, recording unit 106 and memory 108, respectively have the same constructions as the modem 12, operation unit 14, image reading unit 15, image recording unit 16 and memory 20, as described with FIG. 1.

The detailed circuit diagram of the network control unit 150 is shown in FIG. 6.

In the figure, a line condition detecting unit A 151 detects a line connection condition of the line L1 (111), its busy line signal, called signal (CI) and the like. An automatic dialing unit 153 automatically sends via SW158 onto the line L1 or L2 a multiple frequency signal serving as a calling party's telephone number requesting signal. Line connection units A and B (154 and 155) control to drive SW156 and SW157 for forming DC loops for the lines L1 and L2. An off-hook detection unit 161 detects an off-hook state of the built-in telephone set 104. An off-hook/MF detection unit 162 detects of an off-hook state of the external telephone set 200 and detects that a specific MF signal is being sent. Matching transformers A and B (163 and 164) achieve impedance matching of the lines L1 and L2, respectively. The transformers A 163 and B 164 are selected by SW164 to receive reception information for input to the modem 102. SW159 and SW160 selectively connect the built-in telephone set 104 and the external telephone set 200 to either the line L1 or line L2.

The operation of the second embodiment with the above construction will be described with reference to the flow charts shown in FIGS. 7A to 7D.

With the facsimile apparatus of the second embodiment, it is possible to select with the aid of the operation unit 105 the automatic reception mode and the manual reception mode. In both selected modes, each SW in the network control unit 150 is initialized at step S90 of FIG. 7A. That is, SW156 and SW157 are controlled to become open, SW159 is controlled to connect the external telephone set to the line L1, and SW160 is controlled to connect the external telephone set 200 to the line L2.

Next, at step S100, it is checked if a key input from the operation unit 105 is present. In the presence of a key input, step S101 in FIG. 7C follows. In the absence of a key input, S200 follows. At S200, it is checked if the line condition detecting unit A 151 or B 152 detects a CI signal. If it is detected, S201 in FIG. 7B follows, while if not, S300 follows. At S300, it is checked if the off-hook detection unit 161 or the off-hook/MF detection unit 16 detects either an off-hook signal or an MF signal. If either is detected, step S301 in FIG. 7D follows, while if not, S400 follows. At S400, it is checked if data communication is presently performed. If not in data communication, S100 resumes, while if in data communication, S401 follows.

At S401, it is checked if the connected line is open, based on a line connection signal (151b or 152b) from the line condition detecting unit (151 or 152) on the connected line. If the line is open, it means that the called party has an idle line. Then, at S402, the line connection unit (154 or 155) on the line concerned is controlled so as to open the line. SW159 or SW160 is controlled to connect the telephone set to be connected to the line. If the telephone set is busy in speech communication over the other line (upon detection of an off-hook signal), then it remains unconnected. Thereafter, step S100 resumes to terminate data communication.

If the connected line is not open at S401, S403 follows to check if the facsimile apparatus is presently in a data reception mode. In a data reception mode, at S404 data transmitted over the line is demodulated by the modem 102 to receive it via the transmission control unit 103. Received data is temporarily stored in a reception buffer in the memory 108 to output it at step 405 to the recording unit 106. Then, step S406 follows to check if the second telephone number of the partner is present in received data. If not present, S100 resumes, while if present S407 follows to store the received telephone number in the memory 108.

In the conventional facsimile apparatus connected to one line, a speech communication has been conducted by switching the line under data communication to the telephone set after the data communication terminates. Thus, it has been impossible to perform concurrent speech and data communications. However, in the second embodiment of the facsimile apparatus connected to two lines, both lines are respectively used as data communication and speech communication to enable concurrent communication. Apart from the above, it is very annoying to have to remember or memorize both telephone numbers for data communication and speech communication, and to dial two times.

To simplify such operation, in the second embodiment, a pair of the telephone number for data communication, and that for speech communication or that of another telephone located near the facsimile apparatus, are stored in the memory for use with frequently-calling partners. If a speech communication is required during a data communication, or vice versa, then an operation key (not shown) on the operation unit 105 is actuated to such effect, or a specific push button is depressed after the telephone set is picked up. By generating the above-noted MF signal or by other similar operations, the other telephone number stored in the memory 108 is automatically referred to. Thus, by calling the telephone set concerned via the other idle line, it is possible to perform concurrent speech and data communications.

The second telephone number of the partner may be inputted beforehand with the operation unit 105. Generally, the control procedure in facsimile transference conforms with Recommendation T-30 of CCITT. An optional signal is included in the transference procedure for identifying a specific user outside of that Recommendation. By utilizing an optional signal, the second telephone number can be set prior to data communication and stored in the memory 108 without any specific operations from the operator. Thus, the stored second telephone number may be used when necessary. In particular, at the start of data communication, the second telephone number as the optional signal is sent using FIF of NSF and NSS (at S115 to be described later). The second telephone number inserted as a nonstandard information in FIF, is stored at S407 in the memory 108 as the second telephone number sent from the partner, and step S100 resumes.

If the mode at step S403 is not a data reception mode but a data sending mode, then S410 follows to check if a document to be read is present on the reading unit 107. If a document is present, the reading unit 107 reads the document and send it via the transmission control unit 103 to the modem 102 which in turn demodulates the read-out data to send it out onto the line.

The read-out data by the reading unit 107 may be controlled to be temporarily stored in the memory.

If a document to be read is not present on the reading unit 107 at step S410, the network control unit is instructed to open the line under data communication. At step S402, the telephone set is connected to the open line, and thereafter S100 resumes. In case a speech communication is being performed, an execution at S402 is not effected but S100 resumes. If it becomes a suitable timing for data communication, again the processes starting from S403 are executed.

When the line condition detecting unit A151 or B152 detects a called signal (SI signal) from the line connected thereto, CI 151a or 151b is outputted. In this case S201 follows after S200 to check if a data communication is presently performed. If a data communication is presently performed, S202 follows to control SW 160 to connect the reception line to the external telephone set 200. At this time, in response to the calling signal, audible ringing sounds from the external telephone set 200. Then, a speech communication is conducted by picking up (rendering into an off-hook state) the handset of the external telephone set 200 (step S203).

If a data communication is not presently performed at S201, then S204 follows to check if the mode is set at an automatic reception mode. If an automatic reception mode is not set but a manual reception mode is set, then at S205, SW159 or SW160 are controlled to connect the reception line to the telephone set. Then, as shown in S206, audible ringing sounds from the connected telephone set to inform a reception. In this case, however, the control unit 101 performs no specific operation regardless of detection of a CI signal by the line condition detecting unit A or B (151 or 152). Upon picking up the handset of the telephone set (rendering it into off-hook state), a DC loop is formed at the reception line via the telephone set to enable a speech communication with the calling party. After putting the handset on the telephone set (rendering into an on-hook state), the speech communication is terminated.

If the mode at step S204 is an automatic reception mode, S210 follows to check if the reception line is the line L1. If a reception is not onto the L1 (but onto the line L2), then at S111 it is checked if the line L1 is in use (during speech communication). If the line L1 is not in use, S205 follows to connect the external telephone set 200 to the line L2. In this step, if the line L2 is already connected, audible ringing sounds from the beginning from the external telephone set 200.

At S210, if a reception is detected on the line L1, or a reception is detected on the line L2 and the line L1 is in use (during speech communication), S212 follows. At S212, if there is a telephone set connected to the reception line, the telephone set is released from the lines L1 and L2. At the next S213, the line connection unit at the reception line is actuated to form a DC loop. At S214, SW 165 connects the modem 102 to the reception line to enable a data communication. The control unit 101 is AC-coupled to the reception line, via the transmission control unit 103, modem 102, SW165, and transformer T1 or T2, thereby starting a data communication in accordance with the transfer control procedure conforming with Recommendation T-30 of CCITT.

If a key input from the operation unit 105 is present at S100, S101 follows to execute the processes corresponding to the input key.

First, at S101 it is checked if an input is a "stop" key input for stopping the process under execution. In case of a "stop" key input, then S102 follows to check if a data communication is presently performed. If a data communication is not presently performed, the key input is regarded as invalid and S100 resumes without executing any process. If data communication is presently performed, then at S103 the line connection unit at the line in data communication is rendered inactive to release the DC loop of the line concerned to open it. Thereafter S100 resumes. The process for opening the line may be conducted immediately after the "stop" key input in such a way that a process for interrupting a data communication for a certain time is executed, and that only if the next process input is not obtained for the certain time, the line concerned is controlled to open.

If a "stop" key input is not present at S101, S104 follows to check if a reception key input is obtained. While the line L1 is in speech communication with a calling party over the annexed telephone set 104 after the line L1 receives a calling, and if a facsimile transmission or manual reception process is desired to be executed, an unrepresented transmission key or reception key on the operation unit 105 is depressed to effect such a process. An input of the reception key is effective while the manual reception mode is set or in such a case that it becomes necessary to receive data during a speech communication. To this end, in the presence of a reception key input, S105 follows to check if the line L1 is in speech communication. If the line L1 is in speech communication, then at S106 the line connection unit A 154 is actuated similarly to the case at S214. After a DC loop of the line L1 is achieved, the telephone set is released from the line L1. Then, SW165 is switched to the line L1 and the modem 102 is AC-coupled to the line L1 via transformer (T1) 163. And S114 follows thereafter.

If a reception key input is not present at S104, then S107 follows to check if a transmission key input is present. If not present, then S108 follows. If present, S110 follows.

At S110 it is checked if the line L1 is in speech communication. If not, an erroneous key input is assumed and S100 resumes. If in speech communication, S112 follows to check if a document to be transmitted is on the reading unit 107. In the absence of a document, an erroneous key input is assumed to return to S100. In the presence of a document, S113 follows to actuate the line connection unit at the speech communication line similarly to the case at S106 and attain a DC loop of the line. Thereafter, SW165 is controlled to connect the modem 102 and the line concerned. At the next step, S114, it is checked if the telephone number at the other line not in speech communication is stored in the memory 108. If the telephone number is not stored in the memory 108, then S100 resumes. If the number is stored, this number is sent to the partner in accordance with the transfer control procedure conforming with Recommendation T-30 of CCITT to thereafter return to S100.

If a transmission key input is not present at S107, then S108 follows to check if a transfer mode set key input is present. (The term "transfer mode" is here used to mean such a mode for transmitting data of a document read by the reading unit 107. The transfer mode includes a "normal" mode and a "fine" mode.) In the presence of a transfer mode set key input, then at S109 the corresponding transfer mode is set to thereby return to S100.

If a transfer mode set key input is not present at S108, S120 follows to check if a concurrent or simultaneous speech key input is present. If a simultaneous speech key input is present, then S121 follows to check if a data communication is currently being performed. If a data communication is not now being performed, an erroneous input is assumed, to return to S100. In the case of data communication, at S122 it is checked if an idle line is present. If no idle line is present, then S100 resumes. If there is an idle line, at S123, ACU 153 is connected to the idle line to enable to communicate. At the next step, S125, it is checked if the paired telephone number of the partner is stored in the memory 108. If the number is stored, S126 follows to actuate the line connection unit at the idle line to form a DC loop for the line. At the next step, S127, the multiple frequency signal (MF signal) corresponding to the telephone number stored in the memory 108 is outputted from ACU 153. The MF signal is then outputted to the line via SW158. In this embodiment, an unrepresented line monitor unit provided between the transformer (T1) 163 or (T2) 164 and SW162 receives a sound signal on the MF signal output line to output it in the form of sound from an unrepresented acoustic output unit (loudspeaker). Thus, it is possible to acoustically recognize a series of connection procedures in the following automatic transmission processes.

After sending the telephone number stored in the memory 108 at S127, at S128 and S129 it is checked if La line connection signal 151b (or 152b) indicative of detection of the partner's response signal is detected at the line condition detecting unit 151 (or 152), if a busy tone 151c (or 152c) is detected, or if the telephone set is in an off-hook state. If an off-hook state of the telephone set is detected by the off-hook detection unit 161 or the off-hook/MF detection unit 162, then SW159 or SW160 is controlled to connect the off-hook telephone set to the line. The network control unit is released from its operation and thereafter the DC loop of the line is held by the telephone set. S128 resumes thereafter.

Until the telephone set is rendered into an off-hook state, the line monitor unit continues to produce audio sounds, such as for a busy tone, MF signal sending tone, ring-back tone, dial tone respectively from the line, and response tone obtained when the partner responds.

If a response (polarity inversion of the line) from the partner is detected by the line condition unit in a well known manner at S128, then a line connection signal 151a (or 151b) is outputted and the response of the partner is informed at S132. This information is made by an audible sound from the above-noted unrepresented acoustic output unit. In this case, if the handset of the telephone is already picked up and is in an off-hook state, then the audible sound is omitted. Then, S100 resumes.

If a busy tone is detected at S129, then S130 follows to open SW156 or SW157 to release the line. If the telephone set is in an off-hook state, the line is of course held until the telephone set is rendered into an off-hook state.

If a simultaneous communication key input is not present at S120, then S140 follows to check if a dial key input from the operation unit 105 is present. If a dial key input is present, ACU 153 is switched to the line concerned and an MF signal corresponding to the key input is sent and thereafter S100 resumes. If a dial key input is not present at S140, another process corresponding to a key input is performed.

If there exists a detection signal output from the off-hook detection unit 161 or from the off-hook/MF detection unit 162 at S300, then S301 follows to check if the off-hook telephone set is connected to the line. If the telephone set is connected to the line, then S302 follows to check if there exists an MF signal detection signal for the external telephone set 200 from the off-hook/MF detection unit 162. In the absence of an MF signal detection signal, S100 resumes. In the presence of an MF signal detection signal (i.e., an MF signal for designating sending or receiving is detected), S303 follows to check if a data communication is performed. If a data communication is already performed, an erroneous input is assumed to return to S100. If a data communication is not still performed, then S304 follows. If the detected MF signal is one for sending, S112 follows. Whereas if the detected MF signal is one for receiving, then S106 follows.

If the off-hook telephone set is not connected to the line at S301, then S305 follows to check if the line to be connected is open. If the line is busy, then S100 resumes without performing any process. If the line is not busy, then at S307 the telephone set connected to the other line is released. At the next S308, the off-hook telephone set is connected to the other line. Thus, a DC loop for the other line is formed to enable a speech communication (S309).

If the line to be connected is open at S305, then at S310 the off-hook telephone set is connected to the line to thereafter advance to S309.

At S305 or S306, it is noted that the other line and the line concerned are both checked if they are busy. In such case it is to be understood that there is also a case where the line concerned is receiving a calling signal in case it is not busy. For instance, if the line L2 receives a calling signal during a data communication by the line L1, audible ringing sounds from the external telephone set 200. In this case, a speech communication is possible either by picking up (rendering into an off-hook state) the handset of the external telephone set 200 or that of the built-in telephone set 104. Such a case is also applicable to where the line L1 receives a calling signal and the line L2 is in data communication.

As seen from the foregoing description of the second embodiment, although the conventional communication apparatus has only one line to be connected, the communication apparatus of the present invention is provided with an additional line. Therefore, the communication apparatus and the built-in telephone set can be used simultaneously to thereby provide an effective use of the communication apparatus.

A plurality of telephone-sets are commonly used in an office or the like. Without preparing a new line, the communication apparatus of the present invention can connect the old telephone line thereto to add a data communication function. Thus, it is advantageous in that both speech and image function can be attained simultaneously.

In the foregoing description, an MF signal of a push-button type telephone set or the like has been used for identifying a telephone number. However, a dial pulse signal of a dial type telephone set may also be used.

As seen from the foregoing description of the second embodiment, the communication apparatus is connected to at least two lines and can automatically controls sending to and receiving from each line and connecting by a telephone set.

Furthermore, even during a data communication over one line by the communication apparatus, use of another line enables to simultaneously perform a speech communication by a telephone set, thus providing a very useful communication apparatus.

In the first and second embodiments, two telephone lines are used interchangeably for both speech and image communications.

In a third embodiment described hereinunder, two telephone lines are exclusively used for either speech communication or data communication.

Figure 8:
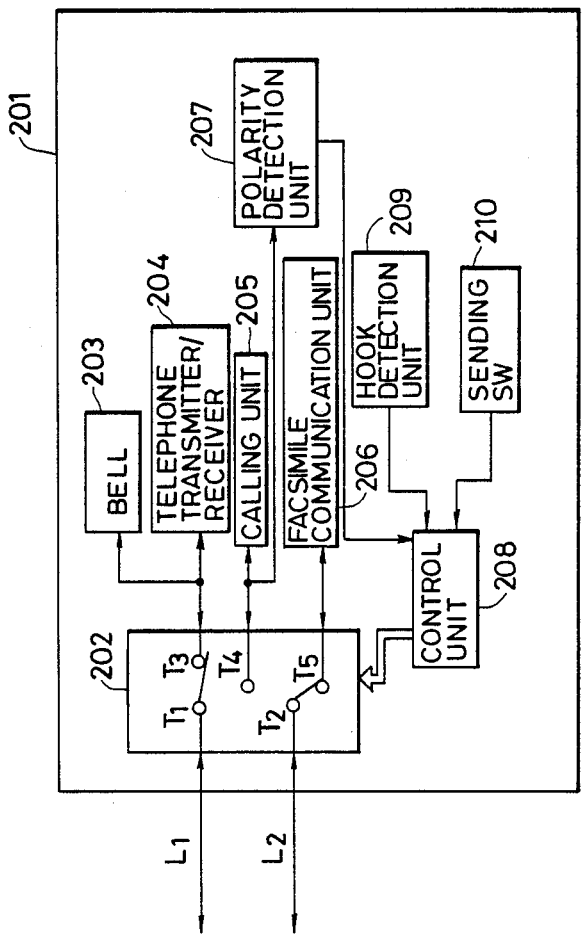
FIG. 8 is a block diagram showing the whole arrangement of a third embodiment of the communication apparatus.

FIG. 8 is a block diagram showing the overall arrangement of the facsimile apparatus according to the third embodiment. In the figure, reference numeral 201 represents the facsimile apparatus with a built-in telephone set, which is connected to two telephone lines L1 and L2. A network control unit 202 controls to switch the lines L1 and L2. A control unit 208 controls the whole system of the facsimile apparatus and is constructed of a CPU, ROM, RAM and so on. A bell 203 rings in response to a calling signal. Reference numeral 204 denotes a telephone transmitter/receiver for performing a speech communication. A calling unit 205 for calling is connected to terminal T4. A polarity detection unit 207 detects an inversion of polarity of the line L1 or L2. A facsimile communication unit 206 performs operations such as sending and receiving a read-out image and recording a received image. A hook detection unit 209 detects an on-hook/off-hook state of the telephone transmitter/receiver 204. A sending switch 210 is used by the operator when the operator desires to send an image to the partner in speech communication with the operator.

The network control unit 202 has terminals T1 and T2 connected to the corresponding lines L1 and L2, terminal T3 connected to the telephone transmitter/receiver 204 and bell 203, terminal R4 connected to the calling unit 5 and polarity detection unit 207, and terminal T5 connected to the facsimile communication unit 206. Terminal T1 is connectable to either terminal T1 or terminal T3, but it is not connectable to terminal T5. Thus, the line L1 is used exclusively for speech communication. On the other hand, terminal T2 is connectable to terminal T4 or terminal T5, but it is not connectable to terminal T3. Thus, the line L2 is used exclusively for data communication.

The calling unit 205 and polarity detection unit 207 are connectable to both lines L1 and L2, so that dialing to both lines and polarity inversions of both lines can be detected.

Figure 9B:
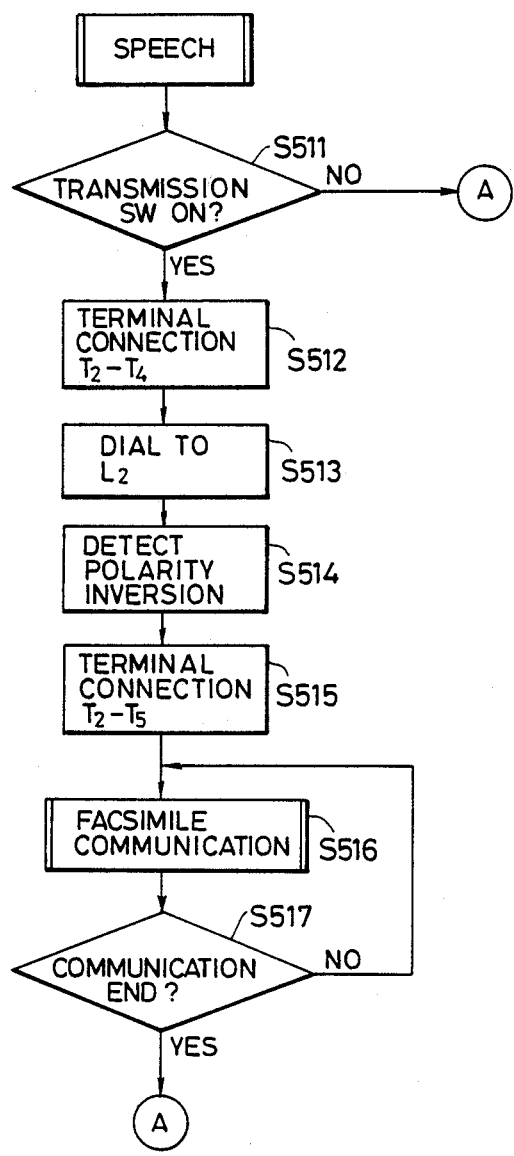

The operation of the facsimile apparatus constructed as above will be described with reference to the flow charts shown in FIGS. 9A and 9B. FIG. 9A shows the main flow, while FIG. 9B shows the control flow during a speech communication.

First, referring to FIG. 9A, at step S501 an output from the hook detection unit 209 is detected. In the case of an on-hook state, step S502 follows to maintain connection states of terminal T1 to T3, and T2 to T5.

That is, during the time when neither speech nor image communication is performed, the telephone line L1 is connected to the telephone transmitter/receiver 204 and bell 203. Therefore, whenever a calling signal is received, ringing of the bell 203 is possible. The facsimile communication line L2 is on the other hand connected to the facsimile communication unit 209, so that whenever is received by the facsimile communication unit 209, facsimile reception is possible.

When a call is not being received by the telephone transmitter/receiver and the telephone is in an off-hook state, then step S503 follows to connect terminal T1 to T4 to send a call (dialing) from the calling unit 205 to the partner (step S505). At step S506, after the polarity detection unit 207 detects a response from the partner, terminal T1 is again connected to terminal T3. In this condition, speech communication is possible. At step S509, if the speech communication is terminated, then a standby state resumes.

The control flow during a speech communication at step S508 will be described with reference to FIG. 9B.

Referring to FIG. 9B, if the sending switch 210 is turned on at step S511, i.e., if a document is to be sent during a speech communication, then step S512 follows to connect terminal T2 to T4. Thus, the facsimile communication line L2, calling unit 205 and polarity detection unit 207 are connected together. At S513, a call is sent to the facsimile communication unit of the partner via the line L2. During this time, since the telephone line L1 is maintained connected to the telephone transmitter/receiver 204, it is possible to send a call to the facsimile line L2 during a speech communication. At step S514, if the facsimile communication unit of the partner is seized and a polarity is inverted, then the polarity detection unit 207 detects the inversion to connect terminal T2 to T5 at step S515. Thereafter, at step S516 a facsimile transmission is conducted. During the facsimile transmission, the operator can have a conversation over the telephone line L1.

Since the dialing numbers of the telephone transmitter/receiver 204 and facsimile communication unit 206 are different from each other, and since the lines L1 and L2 are separate from each other, a calling from another facsimile during such a facsimile communication as well as a calling from another telephone set during such a speech communication is not possible. Therefore, there occurs no flow of data to the telephone transmitter/receiver 204 or speech to the facsimile communication unit 206.

A facsimile transmission is also available while a speech communication is not conducted. In this case, the processes advance according to the flow from S511 to S517 of FIG. 9B.

The telephone transmitter/receiver 204 is not connected to the line L1 during sending a calling so that the operator cannot hear a ring-back sound. To this end, during the time while the calling unit 205 sends a calling to the telephone line L1, terminal T1 may be connected to terminal T3. Furthermore, another arrangement may be employed which enables the operator to hear a quasi-ring-back sound from the telephone transmitter/receiver while sending a call.

As a data communication apparatus, a facsimile apparatus has been described in the present embodiment. However, a communication apparatus for encoded document information is also one to which the invention is applicable.

Although the data communication apparatus and the telephone set have been integrally constructed, those devices may be constructed separately. In this case, the calling unit may be provided on any one of both devices.

As seen from the foregoing description of the third embodiment of the communication apparatus, speech communication means and data communication means are each connected to an independent line, and common calling means is provided for sending a call to each line. Thus, a data communication during a speech communication becomes possible with a simple circuit arrangement. It is also possible to prevent interference due to erroneous flow of speech to the data communication line data to the speech communication line. Furthermore, since a calling from another data communication unit cannot be received by the communications apparatus under communication, it is possible to prevent a malfunction of an automatic data communication unit.

The communication apparatus according to a fourth embodiment will now be described, which can send callings to two telephone line by a single dialing operation.

FIG. 10 is a block diagram showing the fundamental arrangement of the fourth embodiment. In the figure, reference numeral 301 represents operation means actuated by the operator. Control means 302 controls the whole system of the communication apparatus. communication means 303 performs data communication of image data, encoded document data and the like. Network control means 304 controls to switch to communication lines 308. Detection means 305 detects the presence or absence of transmission data such as a document or stored data, or the on-hook/off-hook state of a telephone set. Memory means 306 stores the telephone numbers for speech and data communications with the partner, or a control program of control means 302. Reference number 307 represents speech means used while having a speech.

FIG. 11 is a more particular block diagram corresponding to that of FIG. 10. In the fourth embodiment, an image data communication is performed by communication means.

In the figure, reference A represents an operation unit for designating a operation of the communication apparatus. The operation unit A includes a touch key A1 for initiating a calling operation (dialing) to the partner machine. Control unit C is constructed of a CPU. A facsimile communication unit C is for performing an image data communication with another communication apparatus. A network control unit D controls to switch lines X1 and X2. A document sensor E detects the presence or absence of a document K. A memory unit F stores the program of the control unit B as well as the calling numbers of the facsimile apparatus and the telephone set of the partner, the calling numbers being capable of direct access by the corresponding touch keys A1. A telephone set G is for having a speech with the partner. A first automatic calling unit H1 is for calling the telephone set of the partner. A second automatic calling unit H2 is for calling the facsimile communication unit of the partner. A hook detection unit J is for detecting an on-hook/off-hook state of the telephone set G. References K, X1 and X2 respectively represent a document, and telephone lines.

The operation of the communication apparatus shown in the block diagram of FIG. 11 will be described with reference to the control flow chart of FIG. 13.

In case a speech communication is desired, the operator first picks up (off-hook) the handset of the telephone set and depresses a touch key A1 corresponding to the partner. In this case, a document is not placed on a document read position. Therefore, at step S703 the calling number of the partner stored in the memory unit F is read to send a calling to the partner's telephone set from the first automatic calling unit H1 via the network control unit D, line X1 or X2. At step S706, a speech communication starts.

In case a facsimile communication is desired, the hook detection unit J detects an on-hook state since the operator does not intend to have a speech and does not pick up the handset. Contrary a document is placed on the document read position for transmission of the document so that the document sensor E detects the presence of the document.

Thus, while the operator places a document on the document read position and does not pick up the handset but depress the touched key A1, the processes at step S705 and S706 are performed. At step S705, the facsimile calling number of the partner corresponding to the depressed touch key A1 is read out of the memory unit F. Then, the facsimile communication unit of the partner is called from the second automatic calling unit H2 via the network control unit D, line X1 or X2. At step S706, a facsimile communication starts.

A description will now be directed to the case where the operator desires a facsimile transmission while having a speech over the handset.

The operator sets the document at the document read position, picks up (off-hook) the handset, and depresses a touch key A1 corresponding to the partner.

Figure 13:
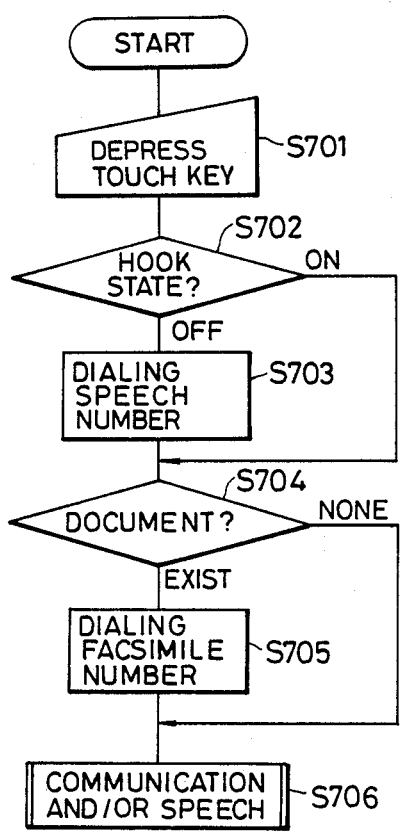
FIG. 13 is a flow chart showing control operations of the fourth embodiment.

In particular, referring to FIG. 13, the processes at steps S703 and S705 are performed. At step S703, as described above, the calling number of the telephone set of the partner is sent from the first automatic calling unit H1 via the line X1 to the telephone set of the partner. At step 705, the calling number of the facsimile communication unit of the same partner is sent from the second automatic calling unit H2 via the line X2 to the facsimile communication unit. Upon responses from the telephone set and facsimile communication unit of the partner, a speech communication is conducted over the telephone set G, while an image data of the document is sent from the facsimile communication unit C.

Three communication modes, i.e., speech communication mode, facsimile communication mode, and both modes are selectively enabled depending on the presence or absence of a document, i.e., the presence or absence of transmission data, and the condition of a telephone set, i.e., whether a speech is intended or not. These modes are summarized in Table of FIG. 12.

As described in the foregoing, it is very convenient in that both speech communication and facsimile communication are enabled by a single dialing operation or touch key operation by the operator.

Although two automatic calling unit H1 and H2 have been used in the present embodiment, only one automatic calling unit need be used, whereby the calling numbers of the telephone set and facsimile communication unit are sequentially sent.

In the fourth embodiment, the touch key has been used in sending both calling numbers of a partner. However, a shortened calling version of a usual calling number to be dialed from a telephone set may also be applicable in sending both calling numbers of a partner. In the case of the shortened calling number, both calling numbers of the partner are stored in correspondence with the shortened calling number. In the case of the usual calling number, the calling number of the faximile communication unit of the partner is stored in correspondence with the calling number of the telephone set of the same partner, or vice versa. With such an arrangement, it is possible to access both calling numbers by a single dialing of either a shortened calling number or a usual calling number.

As described in detail, the communication apparatus of the fourth embodiment is connected to at least two lines, and both communication means and speech means are accessed by a single dialing operation. With the communication apparatus, it becomes possible to perform a data communication while having a speech communication. Furthermore, the operability of the communication apparatus is greatly improved.

Next, an example of the operation units 14, 105 and A of the first, second and fourth embodiments will be described in detail.

Figure 14:
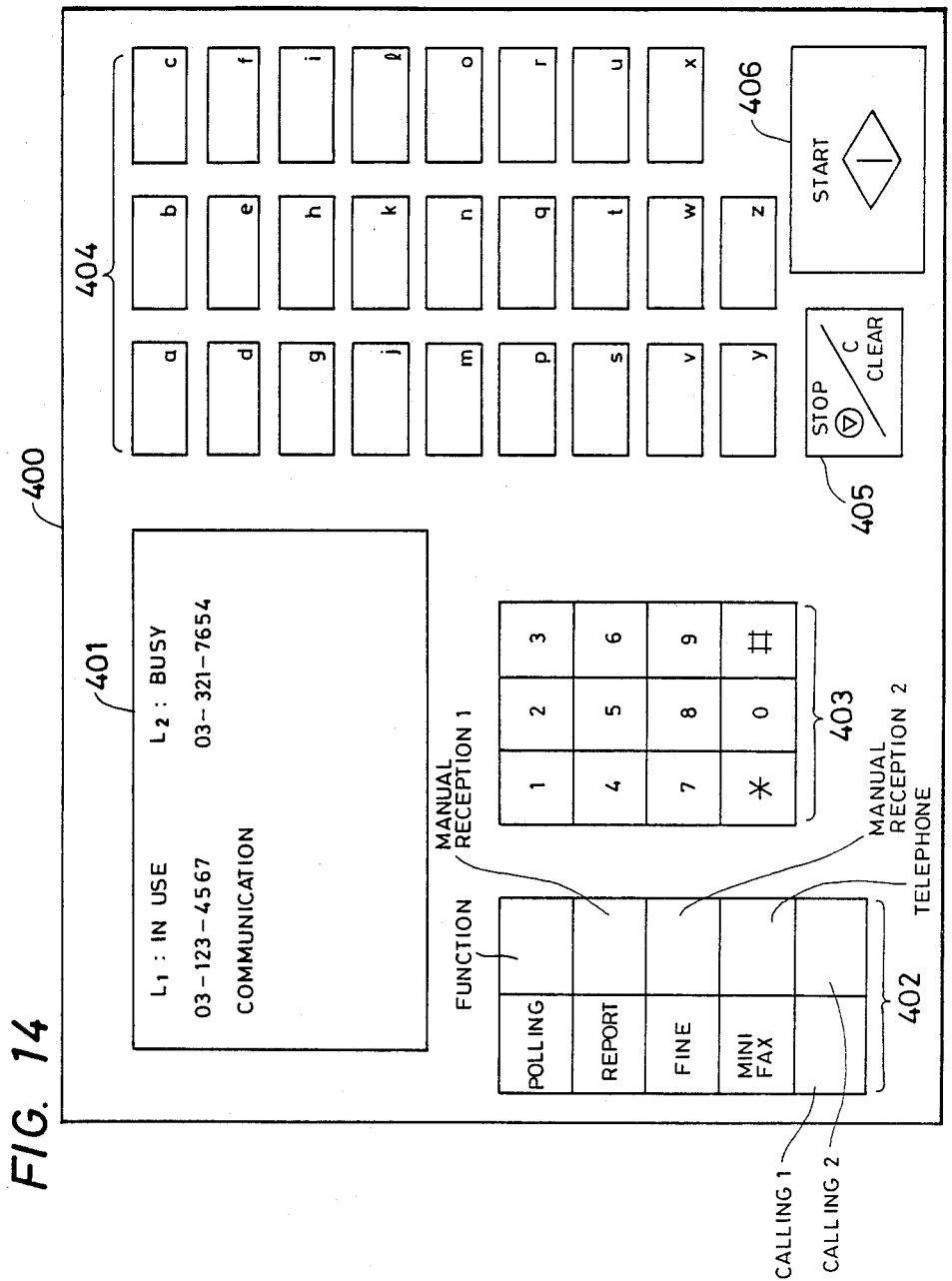
FIG. 14 schematically shows the operation unit of the fourth embodiment.

FIG. 14 schematically shows an example of the operation unit. In the figure, reference numeral 400 represents the operation unit, and reference numeral 401 represents a display which can be such as a liquid crystal display. Reference numeral 402 stands for a group of various function keys, 403 for numeral keys, 404 for touch dial keys, 405 for a stop/clear key, and 406 for a start key.

The display 401 displays, while the lines L1 and L2 are in use, the indications of "in use", of the telephone number of the partner, or whether the line is used in speech communication or facsimile communication. For instance, if the line L1 is in use, "L1: IN USE" is displayed. If the line L2 is in use, ¢L2: IN USE" is displayed. In case a dialing to an open line is sent and the partner is busy, the telephone number of the partner together with an indication that the partner is busy, e.g., "L2: BUSY" is displayed. On the display 401, of FIG. 14, an example of a display is depicted.

As described with regard to the first and second embodiments, in the case that a speech communication is desired while continuing facsimile communication over the line L1 for example, the operator can confirm the open state of the other line L2 from an indication on the display 401. Furthermore, if both lines are called by the operator, the operator can confirm the connection condition of the lines from the indications on the display 401.

Figure 15:
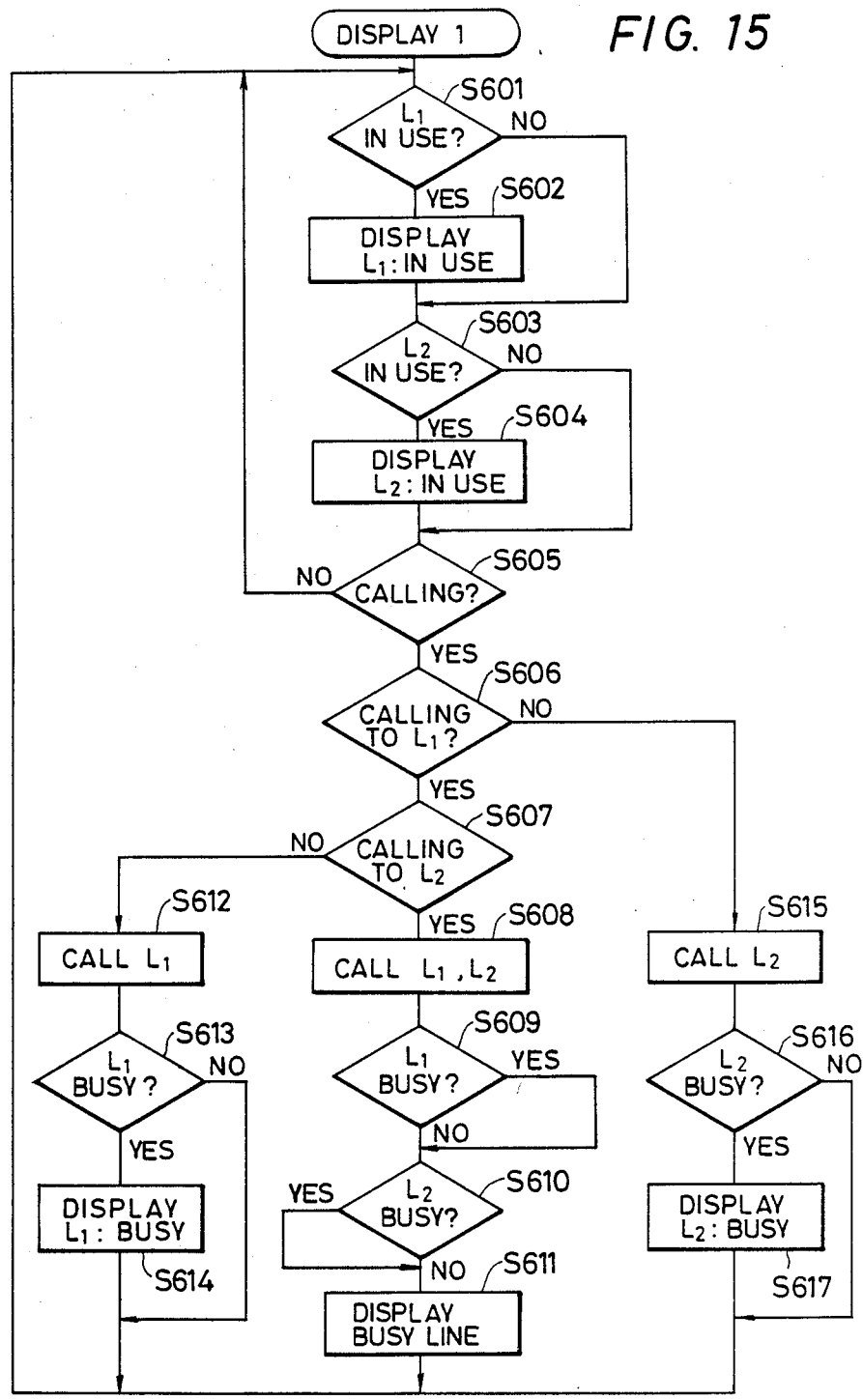
FIG. 15 is a flow chart showing display control for the display 401.

FIG. 15 is a flow chart illustrating the operation to display the line status on the display of FIG. 14. The control operation performed in the flow chart is processed by the control unit of the facsimile apparatus.

At step S601, it is checked if the line L1 is in use. If in use, at step S602 the indications of "L1: IN USE", of the telephone number of the partner, and of whether the partner is in use for speech communication or for facsimile communication, are displayed.

At step S603, it is checked if the line L2 is in use. If in use, the similar indications to step S602 are displayed at step S604.

Steps S601 to S605 are repeated until a dialing operation is initiated at step S605 from the numeral keys 403 or touch dial keys 404 of the operation unit.

If a dialing operation is initiated at step S605, then at steps S606 and S607, it is checked if the dialing operation is directed to the line L1 or the Line L2. In the case of calling to the line L1, step S612 follows step S607. In the case of calling to the line L2, step S615 follows step S606. In the case of calling to both lines L1 and L2, step S608 follows step S607.

In the case of calling to the line L1, at step S612 the dial signal of the partner is sent to the line L1, and its telephone number is displayed on the display 401. At step S613, it is checked if the called party is busy. If the called party is busy, "L1: BUSY" is displayed on the display 401.

In the case of calling to the line L2, at steps S615, S616 and S617 the similar operations at steps S612, S613 and S614 are performed.

In the case of calling to both lines L1 and l2, at step S608 calling operations to the lines L1 and L2 are performed, and the telephone numbers corresponding to the dial signals sent to both lines are displayed on the display 401. At steps S609 and S610 it is checked if the line L1 and L2 are busy. At step S611, "BUSY" is displayed for the busy line or lines. For instance, if the line L1 only is busy, "L1: BUSY" is displayed. If the line L2 only is busy, "L2: BUSY" is displayed. If both lines L1 and L2 are busy, "L1: BUSY, L2: BUSY" is displayed.

In the flow chart of FIG. 15, the judgement of "in use" and "busy" condition of the lines is made based on the output from the CI detection circuits 1 and 2 (FIG.

1) or from the line condition detecting units A and B (FIG. 6).

As described in the foregoing, the line status is displayed on the display 401, and the indications of the telephone number and of whether the line in use is used in speech communication or facsimile communication, are displayed. Thus, it is possible to improve the operability of the communication apparatus.

In the above embodiments, the present invention has been applied to a facsimile apparatus. However, the present invention is not intended to be limited to a facsimile apparatus but is applicable to communication apparatus of various types, such as a telephone set, data communication apparatus of a telex machine, computer and the like.

The present invention is not intended to be limited to the above embodiments, but various modifications are possible within the scope of the appended claims.

We claim:

1. A data communication apparatus comprising:
    data communication means for performing data communication;
    speech communication means for performing speech communication;
    a plurality of communication lines;
    switch means for selectively connecting said data communication means or said speech communication means to any one of said plurality of communication lines;
    selection signal transmission means for transmitting to one of said plurality of communication lines a selection signal according to an intended communication partner such that said communication line is line-connected to the intended communication partner;
    a memory for storing a plurality of selection signal data for speech communication;
    indication means for indicating a communication request so as to perform speech communication with the intended communication partner during data communication by said data communication means; and
    control means for discriminating whether or not the selection signal data for speech communication with the intended communication partner indicated by said indication means is stored in said memory, and controlling said selection signal transmission means such that the selection signal data for speech communication with the intended communication partner is read from said memory on the basis of a result of discrimination by said discrimination means and then the selection signal is transmitted by said selection signal transmission means,
    wherein the selection signal data for speech communication with the intended communication partner indicated by said indication means is stored in said memory before the data communication when transmitted from the intended communication partner.

2. An apparatus according to claim 1, wherein the received selection signal data is received from the communication partner during a data communication protocol.

3. An apparatus according to claim 1, wherein said plurality of communication lines includes at least two communication lines, and said data communication means and said speech communication means are each connected to a respective one of said communication lines.

4. An apparatus according to claim 1, wherein each said selection signal includes a dial signal.

5. An apparatus according to claim 1, further comprising display means which displays a state of each of said communication lines.

6. An apparatus according to claim 1, wherein said control means is also for enabling an automatic reception mode or a manual reception mode to be set for each of said plurality of communication lines.

7. An apparatus according to claim 1, further comprising designation means for designating the communication partner, and wherein said memory stores two selection signals with respect to the communication partner designated by said designation means, and wherein said selection signal transmission means transmits these two selection signals respectively to different ones of said communication lines.

8. An apparatus according to claim 7, wherein the two stored selection signals include selection signals for a data communication apparatus and a speech communication apparatus of the designated communication partner, and wherein, after transmission of these two selection signals, said data communication means is connected to the one of said communication lines through which the selection signal for the data communication apparatus of the communication partner was transmitted and said speech communication means is connected to the one of said communication lines through which the selection signal for the speech communication apparatus of the communication partner was transmitted.

9. An apparatus according to claim 1, wherein said speech communication means includes a telephone set which comprises plural key input means, and said data communication means is operated on the basis of a predetermined key input of said key input means.

10. A communication apparatus comprising:
    a plurality of communication lines;
    data communication means for performing data communication;
    speech communication for performing speech communication;
    selection signal transmission means for transmitting to one of said communication lines a selection signal corresponding to an intended communication partner such that said communication line is line-connected to the intended communication partner;
    a memory for storing a plurality of selection signal data for speech communication;
    indication means for indicating a speech request so as to perform speech communication with the intended communication partner during data communication by said data communication means; and
    control means for discriminating whether or not the selection signal data for the speech communication with the intended communication partner indicated by said indication means is stored in said memory, and controlling the speech communication on the basis of a result of discrimination performed by said discrimination means,
    wherein, only in the case that the selection signal data for the speech communication with the intended communication partner indicated by said indication means is stored in said memory, said control means sends said selection signal according to the selection signal data in said memory for the speech communication to one of said communication liens which is not being used for the data communication, so as to perform the data communication and the speech communication in parallel.

11. An apparatus according to claim 10 wherein each said selection signal includes a dial signal.

12. An apparatus according to claim 10 wherein, selectively, said speech communication means or said data communication means is connected to one of said plurality of communication lines; and further comprising another speech communication means, said other speech communication means being connected to another of said communication lines.

13. An apparatus according to claim 10, further comprising a detection means, wherein said speech communication means includes a telephone set and said detection means detects an off-hook state of said telephone set.

14. An apparatus according to claim 10, further comprising display means which displays a state of each of said communication lines.

* * * * *

UNITED STATES PATENT AND TRADEMARK OFFICE
CERTIFICATE OF CORRECTION

PATENT NO. : 4,825,461
DATED : April 25, 1989
INVENTOR(S) : KENJI KURITA, ET AL.  Page 1 of 3

It is certified that error appears in the above-identified patent and that said Letters Patent is hereby corrected as shown below:

On the title page:

IN [56] REFERENCES CITED

U.S. PATENT DOCUMENTS, "4,530,288  3/1985  Kessler" should read --4,503,288  3/1985  Kessler--.

OTHER PUBLICATIONS, "Korten, "Modern, Phone Home (and Offices)"," should read --Karten, "Modem, Phone Home (and Offices)",--.

SHEET 7 OF 23

FIG. 3A, Block S56, "NOMBER" should read --NUMBER--.

COLUMN 3

Line 34, "detection circuit 2, SW6 and SW8." should read --detection circuit 2, SW4, SW6 and SW8.--.

COLUMN 4

Line 4, "tone" should read -- tone signal--.

COLUMN 8

Line 25, "inform" should read --informs--.
Line 50, "calling" should read --call--.

UNITED STATES PATENT AND TRADEMARK OFFICE
CERTIFICATE OF CORRECTION

PATENT NO. : 4,825,461
DATED : April 25, 1989
INVENTOR(S) : KENJI KURITA, ET AL.

It is certified that error appears in the above-identified patent and that said Letters Patent is hereby corrected as shown below:

COLUMN 9

Line 32, "using" should read --used--.

COLUMN 10

Line 10, "of" (first occurrence) should be deleted.
Line 40, "unit 16" should read --unit 162--.
Line 65, "step 405" should read --step S405--.

COLUMN 12

Line 33, "S111" should read --S211--.

COLUMN 16

Line 22, "terminal R4" should read --terminal T4--.
Line 23, "calling unit 5" should read --calling unit 205--.

UNITED STATES PATENT AND TRADEMARK OFFICE
CERTIFICATE OF CORRECTION

PATENT NO. : 4,825,461
DATED : April 25, 1989
INVENTOR(S) : KENJI KURITA, ET AL.   Page 3 of 3

It is certified that error appears in the above-identified patent and that said Letters Patent is hereby corrected as shown below:

COLUMN 18

Line 23, "Control unit C" should read --Control unit B--.

COLUMN 20

Line 10, "¢L2: IN USE"" should read --"L2: IN USE"--.

COLUMN 22

Line 43, "speech communication" should read --speech communication means--.

COLUMN 23

Line 1, "liens" should read --lines--.
    Line 5, "claim 10" should read --claim 10,--.
    Line 7, "claim 10" should read --claim 10,--.

Signed and Sealed this

Twenty-fourth Day of April, 1990

*Attest:*

HARRY F. MANBECK, JR.

*Attesting Officer*   *Commissioner of Patents and Trademarks*